United States Patent
Inoue et al.

(10) Patent No.: US 8,686,875 B2
(45) Date of Patent: Apr. 1, 2014

(54) PARKING SUPPORT DEVICE

(75) Inventors: Satoru Inoue, Tokyo (JP); Ryotaro Suzuki, Tokyo (JP); Mitsuaki Akaza, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 346 days.

(21) Appl. No.: 13/318,441

(22) PCT Filed: Aug. 26, 2009

(86) PCT No.: PCT/JP2009/004135
§ 371 (c)(1),
(2), (4) Date: Nov. 1, 2011

(87) PCT Pub. No.: WO2011/024220
PCT Pub. Date: Mar. 3, 2011

(65) Prior Publication Data
US 2012/0062396 A1    Mar. 15, 2012

(51) Int. Cl.
*B60Q 1/48* (2006.01)
*G01S 13/93* (2006.01)
*B62D 15/02* (2006.01)

(52) U.S. Cl.
CPC ............. *G01S 13/931* (2013.01); *B62D 15/027* (2013.01)
USPC ........ 340/932.2; 340/435; 340/436; 340/437; 340/438; 701/1

(58) Field of Classification Search
CPC ... G01S 13/931; B62D 15/027; B62D 15/028
USPC ...................................... 340/932.2
See application file for complete search history.

(56) References Cited

U.S. PATENT DOCUMENTS

2005/0285758 A1*  12/2005  Matsukawa et al. ....... 340/932.2
2008/0232198 A1*   9/2008  Hayasaka et al. ............... 367/99
2009/0146842 A1*   6/2009  Jung ........................ 340/932.2

FOREIGN PATENT DOCUMENTS

| JP | 2002-277534 A | 9/2002 |
| JP | 2006-7875 A | 1/2006 |
| JP | 2007-71536 A | 3/2007 |
| JP | 2008-21039 A | 1/2008 |
| JP | 4123259 B2 | 7/2008 |
| JP | 2009-126495 A | 6/2009 |

* cited by examiner

*Primary Examiner* — Kerri McNally
(74) *Attorney, Agent, or Firm* — Birch, Stewart, Kolasch & Birch, LLP

(57) ABSTRACT

A parking support device is provided for extracting detection point data corresponding to a corner portion of a parked vehicle 2 from detection point data showing a series of detection points at each of which the distance to the parked vehicle 2 is detected, performing a noise component removing process and a data complementing process using a curve approximation of the series of detection points on the extracted detection point data, estimating reflection points of a detection wave in the corner portion from the detection point data and sensor position data showing a moving path of a distance sensor 3, and measuring the length of a parking space adjacent to the parked vehicle 2 according to a corner position which is determined from the positions of the estimated reflection points to determine if a vehicle 1 can be parked in the parking space.

18 Claims, 16 Drawing Sheets

PARKING SUPPORT DEVICE

FIELD OF THE INVENTION

The present invention relates to a parking support device which measures a parking space for parallel parking, and notifies a driver if the driver can park his or her vehicle in the parking space.

BACKGROUND OF THE INVENTION

A conventional device applies a detection wave and collects reflection data from an object to be detected, performs parabolic approximation or elliptic approximation on the sequence of points of the reflection data, and performs a rotation correction process on this approximated data to calculate the position of a corner of an obstacle such as a parked vehicle (for example, refer to patent reference 1). Rotation correction means a method of correcting the reflection position of the detection wave in such a way that the angle which a straight line connecting between the position of a sonar for applying the detection wave and the reflection position forms with the moving path of the sonar decreases with increase in the ratio of the amount of variation of the detected distance between the sonar position and the reflection position to the amount of travel of the sonar.

However, while the approximate expression is changed according to the length of the obstacle in this method, it becomes impossible for the approximated curve to approximate the real corner with a high degree of precision as a straight line portion of the obstacle which consists of a linearly-created sequence of points of the reflection data increases in length. More specifically, there is a tendency for the measurement accuracy of the parking space to get worse.

Furthermore, patent reference 2 discloses a conventional device for making a rotation correction to each reflection position by calculating a rotation-corrected angle for each reflection position acquired in time sequence by using the fact that the ratio of the amount of variation of the detected distance to the amount of travel of a sonar becomes nearly equal to the sine in the direction of the normal to an object face. A rotation-correction reflection point which is positioned outermostly with respect to the direction of travel of the sonar, among all rotation-corrected reflection points, is estimated as the position of a corner of the obstacle.

Furthermore, in the removal of noise from the sequence of points which consist of the reflection positions, the reflection data about n points continuous in time sequence are acquired, and noise determination is carried out according to whether or not each point is positioned within an effective range which is set up according to the traveled distance of the vehicle from a reference point. For example, the Nth reflection position is deleted when the data about the next (N+1)th reflection position does not exist within a circle centered at the Nth reflection position and having a fixed radius.

Also in the case of using the method described in patent reference 2, it becomes impossible for the approximated curve to approximate the real corner with a high degree of precision as a straight line portion of the obstacle increases in length, and there is a tendency for the measurement accuracy of the parking space to get worse.

The present invention is made in order to solve the above-mentioned problem, and it is therefore an object of the present invention to provide a parking support device that can measure a parking space with a high degree of precision on the basis of the position of a corner of an object to be detected.

RELATED ART DOCUMENT

Patent reference

Patent reference 1: Japanese Unexamined Patent Application Publication No. 2008-21039
Patent reference 2: Japanese Patent No. 4123259

SUMMARY OF THE INVENTION

A parking support device comprising: a distance sensor unit for applying a detection wave, and receiving a reflected wave of the detection wave from an object to be detected to detect a distance to the object to be detected; a wheel speed sensor unit for detecting a wheel speed of a vehicle; a data acquiring unit for receiving an output of the distance sensor unit and an output of the wheel speed sensor unit when the vehicle is travelling by the object to be detected to create sensor position data showing a moving path of the distance sensor unit which moves as the vehicle travels on a basis of a traveled distance of the vehicle which is determined from the wheel speed detected by the wheel speed sensor unit, while acquiring detection point data showing a series of detection points for each of which a distance is detected by the distance sensor unit moving along the above-mentioned moving path; a data extracting unit for extracting detection point data corresponding to a corner portion of the object to be detected from the detection point data acquired by the data acquiring unit; a noise component removing unit for approximating a series of detection points of the detection point data extracted by the data extracting unit with a curve to determine a detection point which is a noise component on a basis of the approximating curve, and for removing this detection point from the detection point data; a data complementing unit for approximating the series of detection points of the detection point data from which the noise component is removed by the noise component removing unit to perform a data complementing process on the detection point data; a reflection point estimating unit for estimating reflection points of the detection wave in the corner portion of the object to be detected on a basis of the detection point data on which the data complementing process is performed by the data complementing unit, and the sensor position data acquired by the data acquiring unit; a corner position determining unit for determining a position of the corner portion of the object to be detected on a basis of positions of the reflection points estimated by the reflection point estimating unit; and a space length determining unit for measuring a length of a parking space adjacent to the object to be detected on the basis of the position of the corner portion determined by the corner position determining unit, and for presenting a result of determination of whether or not the vehicle can be parked in the parking space to a driver.

The parking support device according to the present invention extracts detection point data corresponding to a corner portion of an object to be detected from detection point data showing a series of detection points at each of which the distance to the object to be detected is detected by the distance sensor unit, performs a noise component removing process and a data complementing process using a curve approximation of the series of detection points on the extracted detection point data, estimates reflection points of a detection wave in the corner portion on the basis of the acquired detection point data and sensor position data showing the moving path of the distance sensor moving as the vehicle travels, and measures the length of a parking space adjacent to the object to be detected on the basis of the position of the corner which is determined from the positions of the estimated reflection points to determine if the vehicle can be parked in the parking space. The parking support device has an advantage of being able to measure the parking space for the vehicle with a high degree of precision by doing in this way.

BRIEF DESCRIPTION OF THE FIGURES

FIG. 6-1 is an enlarged view of a portion corresponding to that shown in FIG. 6(b);

EMBODIMENTS OF THE INVENTION

Hereafter, in order to explain this invention in greater detail, the preferred embodiments of the present invention will be described with reference to the accompanying drawings.

Embodiment 1.

Figure 1:
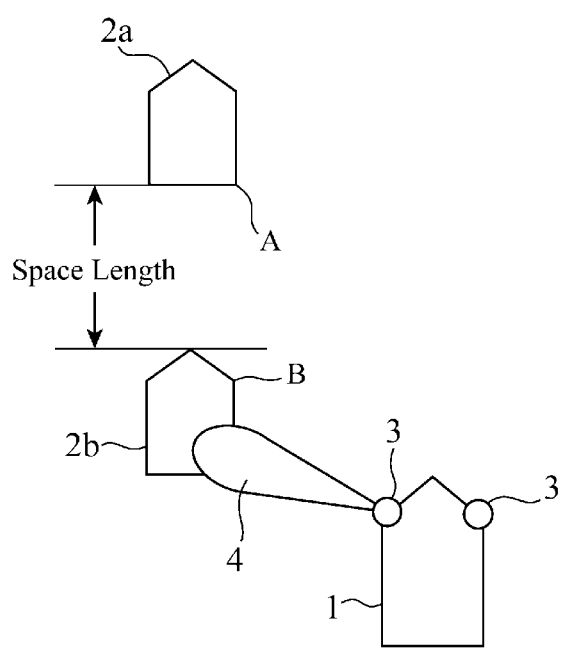
FIG. 1 is a view showing an implementation of parking support in accordance with the present invention.

FIG. 1 is a view showing an implementation of parking support in accordance with the present invention. In FIG. 1, a vehicle 1 is equipped with a parking support device in accordance with the present invention. Distance sensors (distance sensor units) 3 are disposed in right and left side portions of the front of the vehicle. Parked vehicles (objects to be detected) 2a and 2b are parked on a roadside. The parking support device in accordance with the present invention is disposed in the vehicle 1, and supports an operation of parallel parking the vehicle 1 between the parked vehicle 2a and the parked vehicle 2b.

First, the parking support device applies a detection wave from each distance sensor 3 and detects the distance to each of the parked vehicles 2a and 2b which is located in a detection area 4 which is the reachable range of the detection wave while the vehicle travels by each of the parked vehicles 2a and 2b. At this time, each of wheel speed sensors (not shown in FIG. 1) disposed in the vehicle 1 detects a wheel speed and determines the traveling path of the vehicle 1 on the basis of this wheel speed data.

Next, the parking support device detects the position of a corner of each of the parked vehicles 2a and 2b on the basis of both sensor position data showing the moving path of each distance sensor 3 moving as the vehicle 1 travels, and detection point data showing a series of detection points for each of which the distance to a parked vehicle is detected by each distance sensor 3 moving as the vehicle 1 travels. In the example of FIG. 1, the parking support device detects the position of a front corner (front B) of the parked vehicle 2b, and also detects the position of a rear corner (rear A) of the parked vehicle 2a.

According to these corner positions, the parking support device determines the length of a parking space between the parked vehicles 2a and 2b. This determination result is displayed or output via voice by a display monitor or a sound speaker which the vehicle 1 has as an output unit 10 so that the determination result is presented to the driver of the vehicle 1. As a result, the driver can recognize whether he or she can park the vehicle 1 between the parked vehicles 2a and 2b when parallel parking the vehicle 1 between them.

Figure 2:
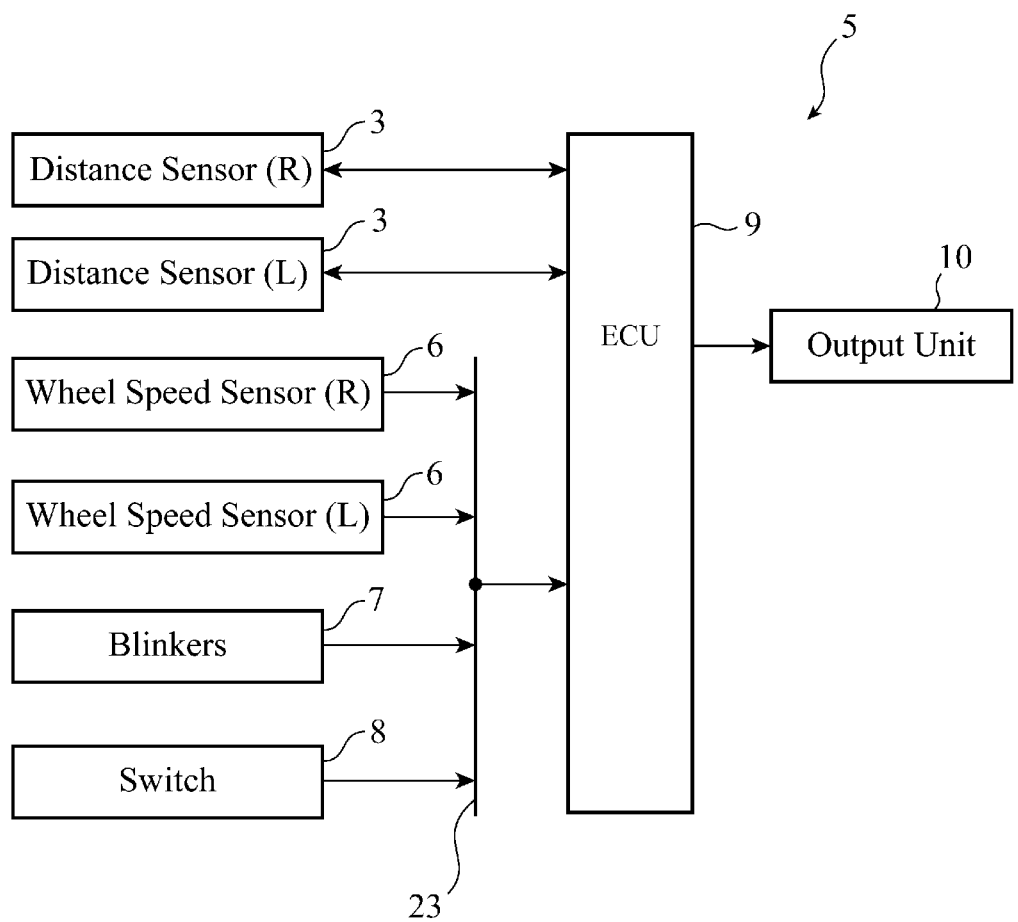
FIG. 2 is a view showing the structure of a parking support device in accordance with the present invention.

FIG. 2 is a view showing the structure of the parking support device in accordance with the present invention. As shown in FIG. 2, in the parking support device 5 in accordance with the present invention, an ECU (Electric Control Unit) 9 is connected to the distance sensors 3, the wheel speed sensors (wheel speed sensor units) 6, blinkers 7, a measurement start switch 8, and the output unit 10, and acquires various pieces of information for parking support. Pieces of information from the wheel speed sensors 6, the blinkers 7, and the measurement start switch 8 are inputted to the ECU 9 via a CAN bus 23. The distance sensors 3 are disposed in the right and left side portions of the vehicle 1, as shown in FIG. 1, and each of them applies a detection wave to an object to be detected, receives a reflected wave of the detection wave from the object to be detected, and detects the distance to the object to be detected. As the detection wave, an ultrasonic wave, a laser beam, a radio wave, or the like can be provided.

The wheel speed sensors 6 each for acquiring wheel speed data are disposed for the right and left rear wheels of the vehicle 1 shown in FIG. 1, and detect the wheel speeds of the wheels, respectively. The wheel speeds detected by the wheel speed sensors 6 are informed to the ECU 19 via the CAN bus 23. Each of the blinkers 7 and the measurement start switch 8 transmits information (direction indication or parking space measurement start) acquired through the driver's operation to the ECU 9 via the CAN bus 23. When parking the vehicle, the driver operates the blinkers 7 to indicate on which one of right and left roadsides he or she is going to park the vehicle. After that, the driver operates the measurement start switch 8 to instruct the parking support device to start a measurement of the length of a parking space on the roadside indicated by the blinkers 7.

The ECU 9 functions as an arithmetic processing unit of the parking support device 5 which measures a parking space on the roadside specified by the blinkers 7 according to the indication by the blinkers 7 and the instruction by the measurement start switch 8 in addition to performing motion control of the vehicle. The output unit 10 presents parking support information or the like to the driver, and is comprised of a display monitor, a sound speaker, etc. which are pieces of vehicle-mounted equipment.

Figure 3:
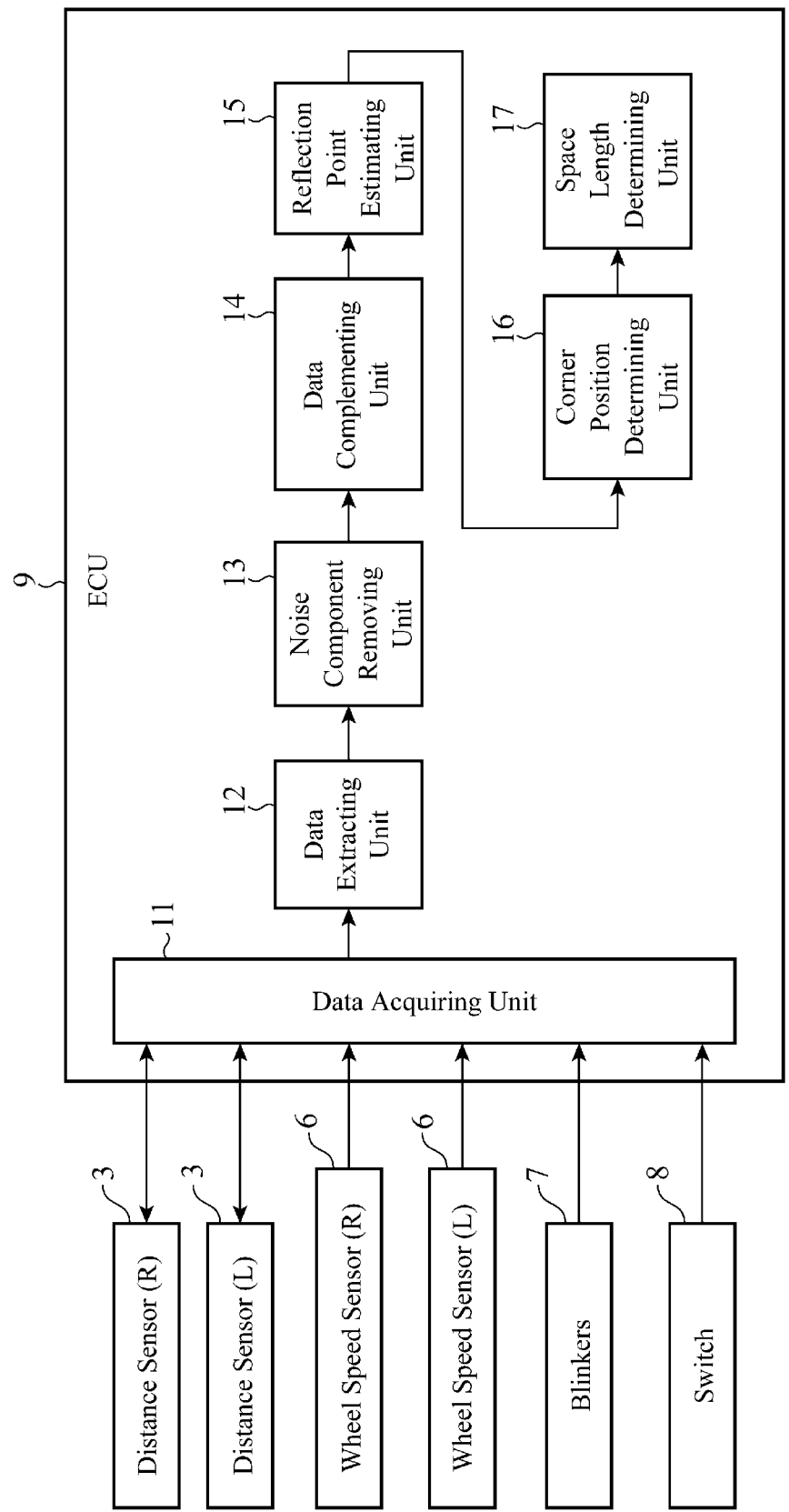
FIG. 3 is a block diagram showing the structure of a parking support device in accordance with Embodiment 1 of the present invention.

FIG. 3 is a block diagram showing the structure of the parking support device in accordance with Embodiment 1 of the present invention, and shows a function configuration of the ECU shown in FIG. 2. As shown in FIG. 3, the ECU 9 is provided with a data acquiring unit 11, a data extracting unit 12, a noise component removing unit 13, a data complementing unit 14, a reflection point estimating unit 15, a corner position determining unit 16, and a space length determining unit 17. In FIG. 3, the CAN bus 23 is not shown.

The data acquiring unit 11 is a component for creating data about the detection points detected by each distance sensor 3, and sensor position data showing the sensor positions running along the moving path of each distance sensor 3 on the basis of the detection information of the distance sensor 3 and the detection information of each wheel speed sensor 6. The data extracting unit 12 is a component for extracting the detection point data corresponding to a corner portion of an object to be detected from among the detection point data acquired by the data acquiring unit 11.

The noise component removing unit 13 is a component for performing a smoothing process with a curve approximation on the series of detection points extracted by the data extracting unit 12 to remove noise components from the detection point data. The data complementing unit 14 is a component for approximating the series of detection points from which the noise components have been removed by the noise component removing unit 13 with a curve to complement the detection point data.

The reflection point estimating unit 15 is a component for estimating reflection points of the detection wave from the detection point data, which are complemented by the data complementing unit 14, and the sensor position data. A reflection point is a reflection position where the ultrasonic wave is reflected by the object to be detected when each distance sensor 3 is an ultrasonic sensor. The corner position determining unit 16 is a component for determining the position of a corner of the object to be detected from data about the reflection points estimated by the reflection point estimating unit 15. The space length determining unit 17 is a component for measuring a parking space on the basis of the coordinates of the positions of corners determined by the corner position determining unit 16 to determine whether or not the vehicle can be parked in the space. In this case, the order of the operation of the blinkers 7 and that of the measurement start switch 8 is arbitrary.

Next, the operation of the parking support device will be explained.

Figure 4:
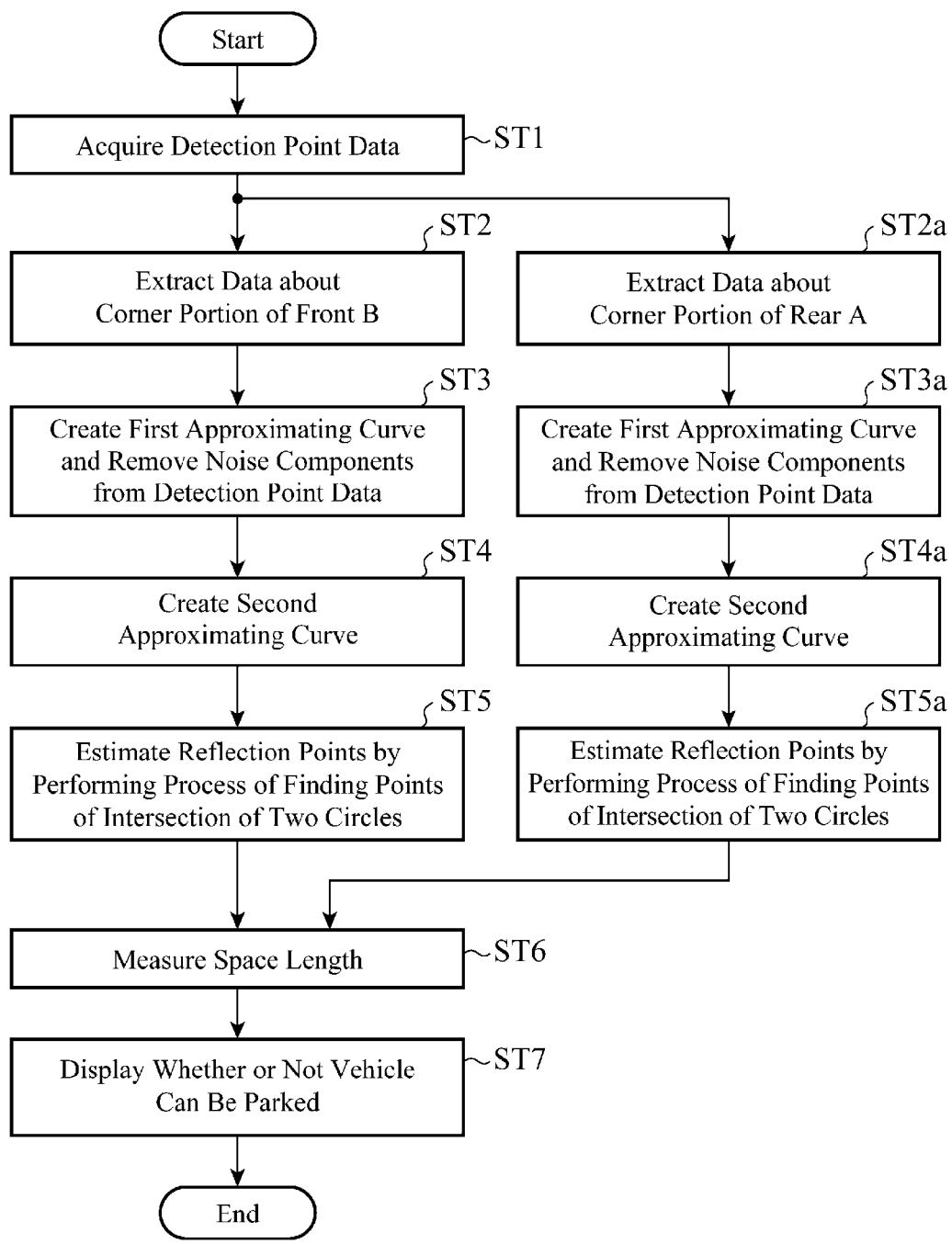
FIG. 4 is a flow chart showing a flow of a parking support operation performed by the parking support device in accordance with Embodiment 1.

FIG. 4 is a flow chart showing a flow of the parking support operation performed by the parking support device according to Embodiment 1. Hereinafter, the operation will be explained assuming that each distance sensor 3 is an ultrasonic sensor.

First, as shown in FIG. 1, when parallel parking the vehicle 1 between the parked vehicles 2a and 2b on a roadside (collectively referred to as the parked vehicles 2 when necessary), the driver of the vehicle 1 turns on the left side blinkers 7, turns on the measurement start switch 8, and drives the vehicle to travel by the parked vehicles 2a and 2b along a direction of an arrow shown in FIG. 1.

When the driver indicates the leftward direction by using the blinkers 7 and turns on the measurement start switch 8, the data acquiring unit 11 starts the left side distance sensor 3 of the vehicle 1 according to the directional indication by the blinkers V. The distance sensor 3 measures the distance to the parked vehicle 2 on the basis of the time elapsed between transmission of the ultrasonic wave to the parked vehicle 2 and reception of the reflected wave from the parked vehicle 2. Furthermore, as the distance sensor 3 carries out the distance detection, the data acquiring unit 11 simultaneously collects and stores the wheel speed data to measure the sensor position of the distance sensor 3 which varies as the vehicle 1 travels on the basis of the stored wheel speed data.

Figure 5:
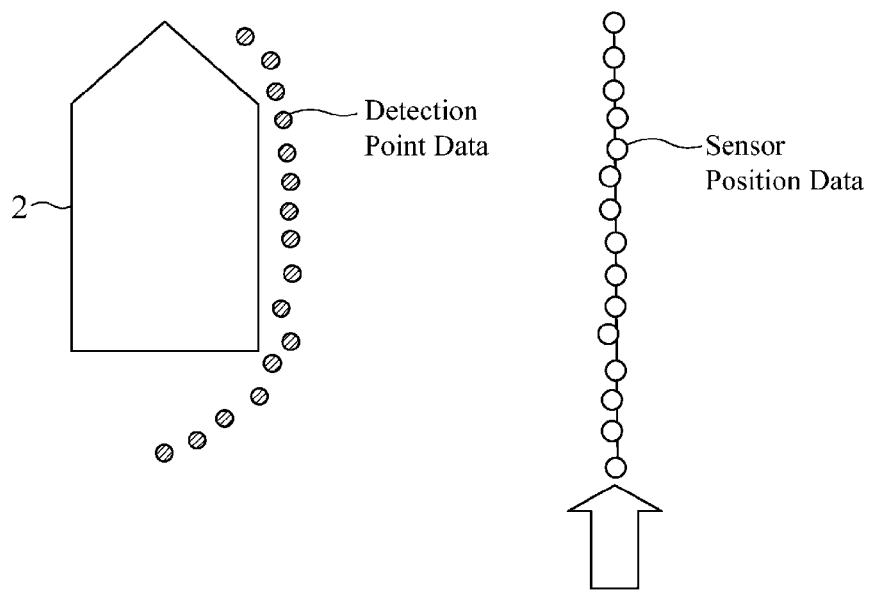
FIG. 5 is a view showing an example of detection point data and sensor position data.

In this way, the data acquiring unit 11 collects detection point data and sensor position data. In this case, the detection point data are data, as shown in FIG. 5, about a series of detection points arranged along the outside shape of the vehicle 2. Furthermore, from the sensor position data, the position of the distance sensor 3 varying along the traveling path of the vehicle 1 which is traveling in a direction of, for example, an arrow of FIG. 5 is determined. The processes explained so far correspond to step ST1.

In step ST1, the data acquiring unit 11 can alternatively operate as follows. First, when the distance to the vehicle 2 is detected for the first time by the distance sensor 3 after the measurement start switch 8 is turned on, the data acquiring unit 11 starts storing the wheel speed data inputted from the wheel speed sensors 6. After that, when the distance is not detected by the distance sensor 3 while the vehicle 1 travels a predetermined distance or longer, the data acquiring unit 11 stops the storage of the wheel speed data, and, when the distance is newly detected as the vehicle 1 further travels, restarts the storage to store the wheel speed data for each parked vehicle.

By thus starting the storage from the wheel speed data at the time of detecting detection point data for the first time for each parked vehicle, the data acquiring unit updates the position coordinates of the distance sensor 3 by using the newest wheel speed data according to the acquisition of detection points. As a result, excessive wheel speed data in a parked vehicle undetected section where no parked vehicle is detected and which does not correspond to any corner position calculation and errors occurring in the wheel speed data can be prevented from being stored.

The data extracting unit 12 extracts the data corresponding to the corner portion of the front B of the parked vehicle 2b shown in FIG. 1, and the data corresponding to the corner portion of the rear A of the parked vehicle 2a from the detection point data acquired by the data acquiring unit 11 (steps ST2 and ST2a).

When receiving the detection point data corresponding to the corner portion of the front B extracted by the data extracting unit 12, the noise component removing unit 13 creates a first approximating curve that approximates the series of detection points of this detection point data, and deletes detection points which are at a fixed distance or longer from the approximating curve as noise components (step ST3). Similarly, when receiving the detection point data corresponding to the corner portion of the rear A, the noise component removing unit 13 creates a first approximating curve that approximates the series of detection points of this detection point data, and deletes detection points which are at a fixed distance or longer from the approximating curve as noise components (step ST3$a$).

When receiving the detection point data corresponding to the corner portion of the front B from which the noise components are deleted by the noise component removing unit 13, the data complementing unit 14 creates a second approximating curve that approximates the series of detection points of this detection point data and complements the detection point data (step ST4).

Similarly, when receiving the detection point data corresponding to the corner portion of the rear A from which the noise components are deleted by the noise component removing unit 13, the data complementing unit 14 creates a second approximating curve that approximates the series of detection points of this detection point data and complements the detection point data (step ST4$a$).

Hereafter, a data extracting method which the data extracting unit 12 uses will be shown, and the details of above-mentioned steps ST2 to ST4 and ST2$a$ to ST4$a$ will be explained. As the method of extracting the detection point data corresponding to the corner portion, the following examples (1) to (3) will be provided.

(A) Data Extraction Algorithm 1

Figure 6:
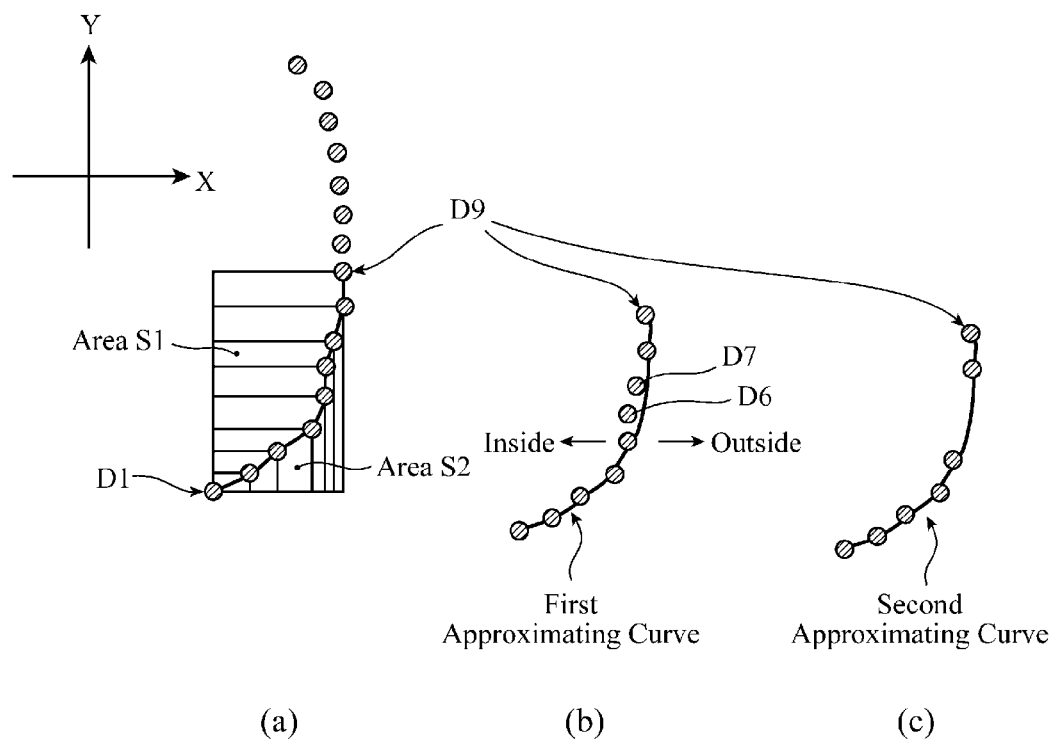
FIG. 6 is a view showing an example of data extraction using area ratio determination.
Figures 1, 6:
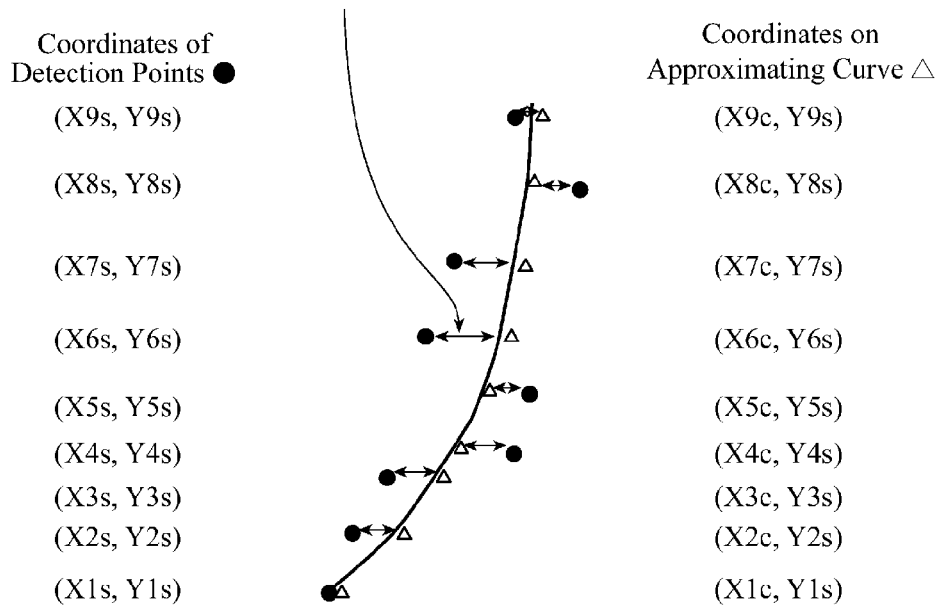

FIG. 6 is a view showing an example of data extraction using area ratio determination. An xy coordinate system shown in FIG. 6($a$) is a two-dimensional rectangular coordinate system which is parallel to a ground surface and in which the traveling direction of the vehicle 1 travelling by a parked vehicle 2 is defined as the y coordinate axis and the direction in which the distance to the parked vehicle is detected by one distance sensor 3 is defined as the x-coordinate axis.

When carrying out the data extraction using the area ratio determination, a detection point D1 which is acquired for the first time in the detection point data is defined as a reference point, and rectangles in which the detection point D1 and each of the detection points which are sequentially detected after the detection point D1 are opposite vertices connected via a sloping line are defined, as shown in FIG. 6($a$).

When receiving the detection points which are detected sequentially, the data extracting unit 12 connects between any two adjacent ones of the detection points which are the vertices including from the vertex corresponding to the detection point D1 up to the vertex corresponding to the newest detection point by using a sloping line, calculates the ratio (S1/S2) of the area S1 which is the sum of first divided areas of the rectangles as mentioned above on the side of the parked vehicle 2 (inside) and the area S2 which is the sum of second divided areas of the rectangles on the side of the vehicle 1 (outside) for each of the detection points, the area of each of the rectangles being divided into the first and second areas by the corresponding sloping line, and compares the ratio with a predetermined threshold K1.

As shown in FIG. 1, when the parking support device operates the distance sensors 3 while the vehicle 1 travels in turn by the parked vehicles 2$b$ and 2$a$, the parking support device detects the distance to the corner portion of the rear of the parked vehicle 2$b$ first, will detect the distance to the side of the parked vehicle 2$b$, and will further detect the distance to the corner portion of the front B of the parked vehicle 2$b$. After detecting the distance to the corner portion of the rear of the parked vehicle 2$b$, when the vehicle 1 advances between the parked vehicle 2$b$ and the parked vehicle 2$a$, the parking support device does not receive any reflected wave and does not detect any distance, and, when the vehicle 1 further advances up to the parked vehicle 2$a$, detects the distance to the corner portion of the rear A of the parked vehicle 2$a$, then detects the distance to the side of the parked vehicle 2$a$, and further detects the distance to the corner portion of the front of the parked vehicle 2$a$.

Therefore, the data extracting unit 12 then traces the detection point data about the detection points which have been detected until the detection area 4 of the distance sensor 3 has reached the parking space between the parked vehicle 2$b$ and the parked vehicle 2$a$ in reverse chronological order to extract detection point data about a section of detection points at each of which the area ratio S1/S2 is equal to or smaller than the threshold K1 from among the detection point data (step ST2). Although the process of extracting the detection point data corresponding to the corner portion of the front B is not shown in the figure, the process of extracting the detection point data corresponding to the corner portion of the rear A is shown in the figure and will be explained.

Next, the data extracting unit 12 extracts the detection points including the detection point in the corner portion of the rear A which is detected for the first time and all detection points at each of which the area ratio S1/S2 does not exceed the threshold K1 as detection point data corresponding to the corner portion of the rear A (step ST2$a$). In the example of FIG. 6($a$), because the detection point which is detected immediately after the detection point D9 has an area ratio S1/S2 exceeding the threshold K1, the series of detection points including from the detection point D1 which is detected for the first time in the corner portion up to the detection point D9 are extracted as detection point data about the corner portion of the rear A.

As mentioned above, in the area ratio determination, by using the fact that a series of detection points are aligned in a straight line along a side of each parked vehicle 2, a series of detection points are aligned in a curved line along a corner portion of each parked vehicle 2 and the area ratio S1/S2 of a detection point varies between the side and the corner portion of each parked vehicle 2 in the two-dimensional rectangular coordinate system which is parallel to a ground surface and in which the traveling direction of the vehicle 1 travelling by a parked vehicle 2 is defined as the y coordinate axis and the direction in which the distance to the parked vehicle is detected by one distance sensor 3 is defined as an axis perpendicular to the y-coordinate axis, the detection point data corresponding to the corner portion are extracted.

Next, the operation of the noise component removing unit 13 will be explained by using the data corresponding to the corner portion of the rear A.

After the data extracting unit 12 extracts the detection point data corresponding to the corner portion of the rear A, the noise component removing unit determines the parameters of a 3rd-degree polynomial approximating curve ($x=ay^3+by^2+cy+d$) by fitting this curve to the series of detection points using the least-squares method to create a first approximating curve, as shown in FIG. 6($b$). The noise component removing unit 13 then deletes all detection points each of which has a deviation exceeding a predetermined range in the direction in which the distance is detected by the distance sensor 3 (the direction of the x axis) from the 3rd-degree approximating curve which the noise component removing unit has determined as noise components (step ST3a). An example is shown in FIG. 6(b). In this example shown in the figure, the detection points D6 and D7 are deleted.

For example, as shown in FIG. 6-1 (this is an enlarged view of a part corresponding to that shown in FIG. 6(b)), the standard deviation σ of the difference (Xic−Xi) in the direction in which the distance is detected by the distance sensor 3 between each point (Xic, Yic) on the 3rd-defree approximating curve and the corresponding detection point (Xi, Yi) is multiplied by a fixed coefficient j and the result of this multiplication is defined as a threshold, and all detection points each of which has a deviation exceeding this threshold are deleted. Furthermore, any detection point satisfying [|Xic−Xi|<=j×σ] is not deleted. In this case, the standard deviation meets the following equations.

$$x(\text{bar}) = (1/n) \times \Sigma Xi (i=1, \ldots, n)$$

$$\sigma^2 = (1/n) \Sigma (Xi - x(\text{bar}))^2$$

By doing in this way, the parking support device smooths the curved line which is formed by the series of detection points aligned along the outside shape of each parked vehicle 2, and can provide the detection points which are closer to the vehicle 1 as effective detection point data. As a result, the parking support device can estimate the position of the endmost point of the outside shape of each parked vehicle 2.

As an alternative, the parking support device can multiply the standard deviation σ of the difference in the direction in which the distance is detected by the distance sensor 3 between each point on the 3rd-degree approximating curve and the corresponding detection point by a fixed coefficient j and adds a constant coefficient k to the result of the multiplication to obtain a threshold, and defines characteristic values as the coefficients j and k for a portion located inside the 3rd-degree approximating curve and characteristic values as those for a portion located outside the 3rd-degree approximating curve, and can delete all detection points each of which has a deviation exceeding the above-mentioned threshold.

By thus weighting the threshold for noise removal in the portion located inside the 3rd-degree approximating curve and that in the portion located outside the 3rd-degree approximating curve, the parking support device can improve the accuracy of estimation of the position of the endmost point of the outside shape of each object to be detected (each parked vehicle 2). For example, the weighting of those thresholds by using the coefficients satisfying the following inequality: (inside coefficient)>(outside coefficient) is effective for a case of removing detection points of a hollow shape such as a tire house.

The data complementing unit 14 determines the parameters of a 3rd-degree polynomial approximating curve (x=ay³+by²+cy+d) by similarly fitting this curve to the series of detection points remaining after the process performed by the noise component removing unit 13 using the least-squares method to create a second approximating curve, as shown in FIG. 6(c). As a result, the detection point data are complemented with the second approximating curve.

Although in the above-mentioned explanation the case in which the series of detection points are approximated by a 3rd-degree polynomial approximating curve, a 2nd-degree polynomial approximating curve can be used, for example, as long as it can approximate the series of detection points appropriately.

(B) Data Extraction Algorithm 2

Figure 7:
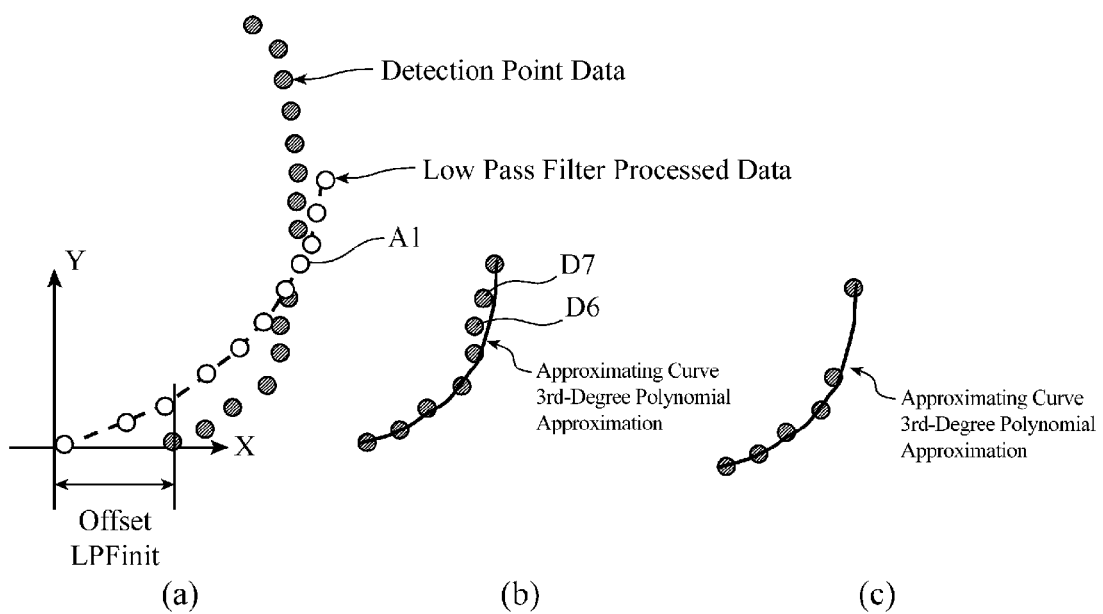
FIG. 7 is a view showing an example of data extraction using determination of intersection between detection point data and low pass filter processed data.

FIG. 7 is a view showing an example of data extraction using determination of intersection of detection point data and low pass filter processed data. An xy coordinate system shown in FIG. 6(a) is a two-dimensional rectangular coordinate system which is parallel to a ground surface and in which the traveling direction of the vehicle 1 travelling by a parked vehicle 2 is defined as the y coordinate axis and the direction in which the distance to the parked vehicle is detected by one distance sensor 3 is defined as the x-coordinate axis, like that shown in FIG. 6.

The low pass filter processed data are curved line data approximating a series of detection points corresponding to a corner portion, and are determined by low pass filtering an offset LPFinit and detection point data by using the following equations (1) and (2). In this case, each detection point is expressed as Pi(xi, yi) (i=1, 2, 3, 4, and the following equation: LPFx1=x1−LPFinit is provided.

Furthermore, LPFxi is a current value of an LPF approximating curve, and LPFxi−1 is a previous value of the LPF approximating curve. α is a preset LPF degree of influence, and LPFinit is a preset initial offset amount (offset shown in FIG. 7 (a)).

$$LPFxi = LPFxi-1 + (xi - LPFx-i) \times \alpha \quad (1)$$

$$LPFyi = yi \quad (2)$$

After calculating the low pass filter processed data, the data extracting unit 12 compares the approximating curve of the low pass filter processed data with the series of detection points.

When extracting the detection point data corresponding to the corner portion of the front B of the parked vehicle 2b, if determining from the above-mentioned comparison that there is a detection point which intersects the approximating curve of the low pass filter processed data, the data extracting unit 12 traces the series of detection points on a side of the vehicle's side surface which have been detected sequentially before the above-mentioned detection point is detected back to a detection point located backward by a predetermined number of detection points, and extracts a series of detection points which are closer to the corner end with respect to the position of this detection point (step ST2).

Furthermore, when extracting the detection point data corresponding to the corner portion of the rear A of the parked vehicle 2a, if there is a detection point A1 which intersects the approximating curve of the low pass filter processed data, the data extracting unit 12 extracts the series of detection points including from the detection point which is detected for the first time for the parked vehicle 2a up to the detection point A1 (step ST2a).

After the data extracting unit 12 extracts the detection point data corresponding to the corner portion of the rear A, the noise component removing unit 13 determines the parameters of a 3rd-degree polynomial approximating curve by fitting this curve to this group of detection points using the least-squares method in the same way as that mentioned above to create a first approximating curve, as shown in FIG. 7(b). The noise component removing unit 13 then determines all detection points each of which has a deviation exceeding a predetermined range in the direction in which the distance is detected (the direction of the x axis) from this 3rd-degree approximating curve as noise components, and then deletes them (step ST3a). An example of the noise component removal is the same as that shown in (A) data extraction algorithm 1.

The data complementing unit 14 determines the parameters of a 3rd-degree polynomial approximating curve by similarly fitting this curve to the series of detection points remaining after the process performed by the noise component removing unit using the least-squares method to create a second approximating curve, as shown in FIG. 7(*c*). As a result, the detection point data are complemented with the second approximating curve.

(C) Data Extraction Algorithm 3

Figure 8:
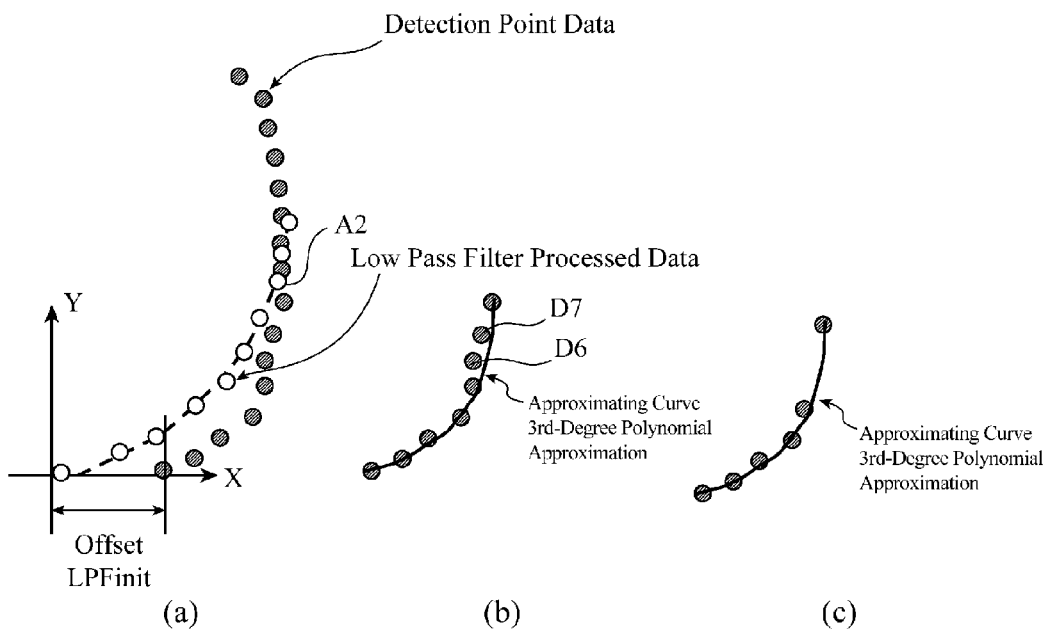
FIG. 8 is a view showing an example of data extraction using determination of difference between detection point data and low pass filter processed data.

FIG. 8 is a view showing an example of data extraction using determination of a difference between detection point data and low pass filter processed data. An xy coordinate system shown in FIG. 8(*a*) is a two-dimensional rectangular coordinate system which is parallel to a ground surface and in which the traveling direction of the vehicle 1 travelling by a parked vehicle 2 is defined as the y coordinate axis and the direction in which the distance to the parked vehicle is detected by one distance sensor 3 is defined as the x-coordinate axis, like that shown in FIG. 6.

Although in the above-mentioned intersection determination, detection points corresponding to a corner portion are extracted by defining a detection point which intersects an approximating curve of low pass filter processed data as a reference, in this difference determination a detection point whose difference between its coordinate value and those of low pass filter processed data in the direction in which the distance is detected (the direction of the x axis) is smaller than a predetermined threshold is defined as a reference.

After calculating low pass filter processed data as shown in FIG. 7, the data extracting unit 12 calculates the difference in coordinate in the direction in which the distance is detected (the direction of the x axis) between this low pass filter processed data and each detection point, and compares this difference with the predetermined threshold.

When extracting the detection point data corresponding to the corner portion of the front B of the parked vehicle 2*b*, if determining from the above-mentioned comparison that there is a detection point whose difference is smaller than the predetermined threshold, the data extracting unit 12 traces the series of detection points which have been detected sequentially before this detection point is detected back to a detection point located backward by a predetermined number of detection points, and extracts a group of detection points which are closer to the corner end with respect to the position of this detection point (step ST2).

Furthermore, when extracting detection point data corresponding to the corner portion of the rear A of the parked vehicle 2*a*, if determining that there is a detection point A2 whose difference is smaller than the above-mentioned predetermined threshold, the data extracting unit 12 extracts a series of detection points including from a detection point in the parked vehicle 2*a* which is detected for the first time up to the detection point A2 (step ST2*a*).

After the data extracting unit 12 extracts the detection point data corresponding to the corner portion of the rear A, the noise component removing unit 13 determines the parameters of a 3rd-degree polynomial approximating curve by fitting this curve to this series of detection points using the least-squares method in the same way as that mentioned above to create a first approximating curve, as shown in FIG. 8(*b*). The noise component removing unit 13 then determines all detection points each of which has a deviation exceeding a predetermined range in the direction in which the distance is detected (the direction of the x axis) from this 3rd-degree approximating curve as noise components, and then deletes them (step ST3*a*). An example of the noise component removal is the same as that shown in (A) data extraction algorithm 1.

The data complementing unit 14 determines the parameters of a 3rd-degree polynomial approximating curve by similarly fitting this curve to the series of detection points remaining after the process performed by the noise component removing unit 13 using the least-squares method to create a second approximating curve, as shown in FIG. 8(*c*). As a result, the detection point data are complemented with the second approximating curve.

Returning to the explanation of FIG. 4, the reflection point estimating unit 15 estimates the coordinates of each reflection point of each corner portion by performing a process of finding the points of intersection of two circles by using the detection point data complemented by the data complementing unit 14 and the sensor position data (step ST5 and step ST5*a*). Hereafter, the process of finding the points of intersection of two circles will be explained in detail.

Each distance sensor 3 (ultrasonic sensor) forms a detection area 4 as shown in FIG. 1 by applying a search signal (ultrasonic wave) having a certain divergence with respect to the central axis of an irradiation hole thereof. More specifically, each distance sensor 3 receives a reflected wave (ultrasonic echo signal) from an object to be detected in a reception area having a certain angle of visibility. Therefore, there occurs a case in which a reflection point at which the detection wave is reflected cannot be brought into correspondence with any detection point at which the distance to the object to be detected is detected.

Figure 9:
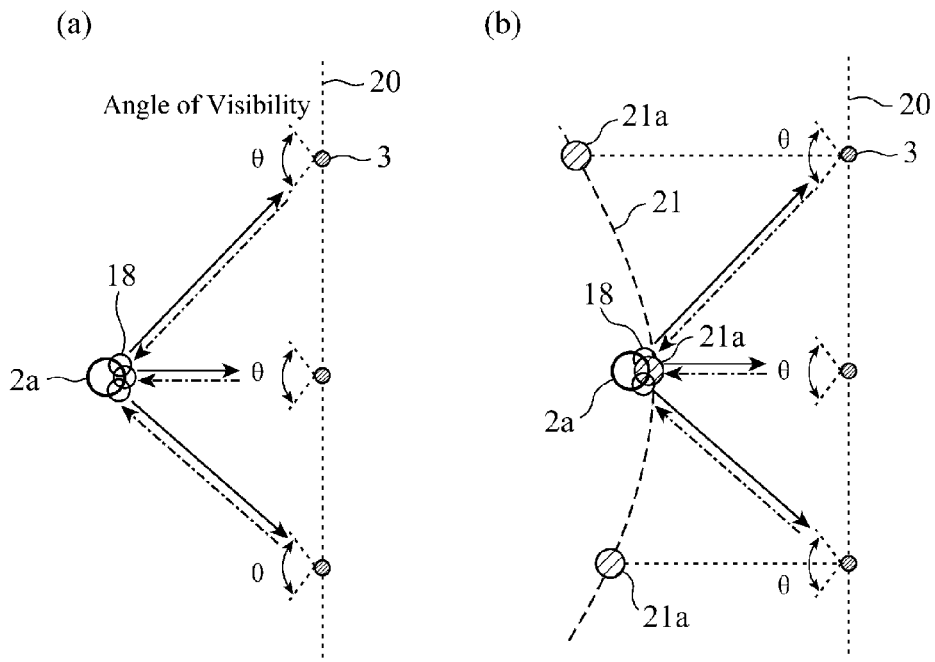
FIG. 9 is a view for explaining a case in which a reflection point does not match any detection point.

FIG. 9 is a view for explaining the case in which a reflection point cannot be brought into correspondence with any detection point. As shown in FIG. 9(*a*), when the object to be detected 2*a* is a small obstacle having a small curvature, such as a cone or a pole, the detection wave applied from one distance sensor 3 at each position of the traveling path 20 (shown by a dash-dotted arrow) is reflected at each of reflection points 18 close to each other on the object to be detected 2*a*. Each reflected wave (shown by a solid arrow) which has reached to the reception area having the angle of visibility θ is received by the distance sensor 3.

The distance sensor 3 at each position of the traveling path 20 measures the distance between the irradiation hole via which the distance sensor emits the detection wave and the detection point 21*a* on the basis of the time which has elapsed until the distance sensor receives the reflected wave after applying the detection wave. Therefore, there is a case in which, as shown in FIG. 9(*b*), possible detection points 21 are widely distributed throughout the locus of the detection points 21 along the traveling direction of the vehicle, and the reflection point 18 of the object to be detected 2*a* cannot be brought into correspondence with any detection point 21*a*.

To solve this problem, the parking support device in accordance with Embodiment 1 estimates the position coordinates of each reflection point from the detection point detected by each distance sensor 3 at each position in the traveling path by performing the process of finding the points of intersection of two circles using the detection point data and the sensor position data.

Figure 10:
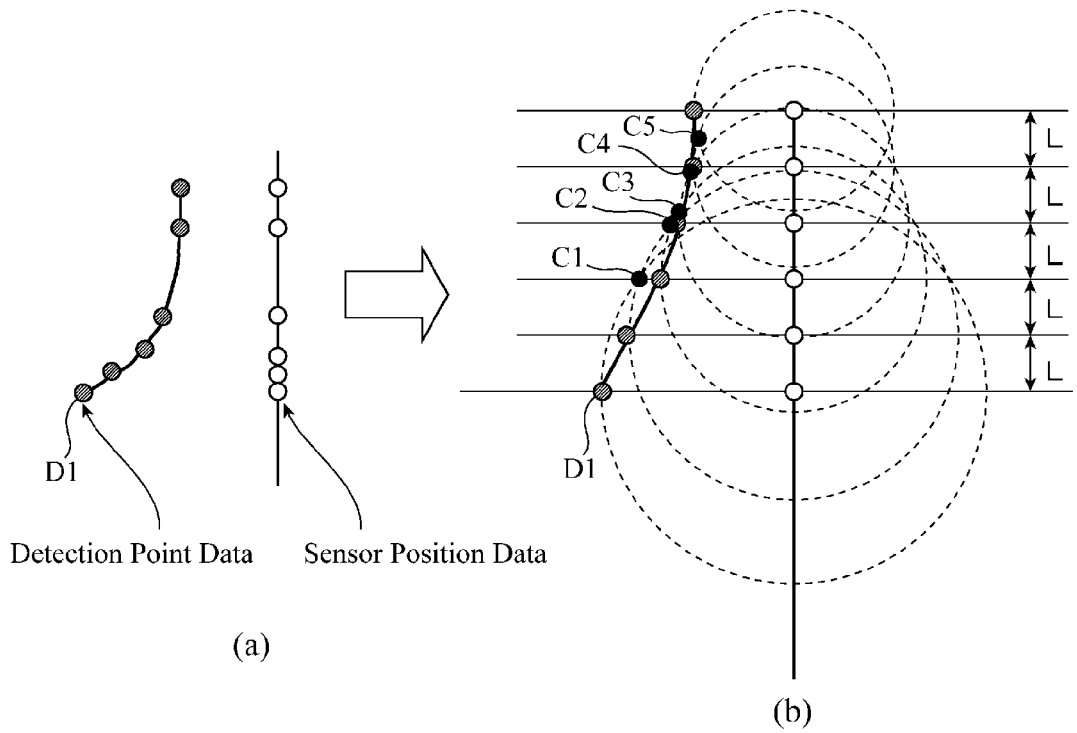
FIG. 10 is a view showing an example of a process of finding the points of intersection of two circles.

FIG. 10 is a view showing an example of the process of finding the points of intersection of two circles. The reflection point estimating unit 15 receives detection point data corresponding to such a corner portion as shown in FIG. 10(*a*) from the data complementing unit 14, and also determines sensor position data showing positions of a distance sensor 3 from the wheel speed data stored according to the detection of the distance by the distance sensor 3.

There is a case in which the distance sensor 3 provides densely packed detection points and sparsely located detection points, depending upon the travelling speed of the vehicle 1, because the distance sensor 3 moves along the traveling track of the vehicle 1. In this case, because the positions of the detection points and the positions of the distance sensor are not spaced at constant intervals along the traveling direction of the vehicle 1, the subsequent processes become complicated.

To solve this problem, the data complementing unit 14 converts the detection point positions of the detection point data and the sensor positions of the sensor position data in such a way that the detection point positions and the sensor positions are spaced at constant intervals of length L along the traveling direction of the vehicle 1 with respect to the detection point D1 which is the endmost one of the detection points. At this time, the data complementing unit maintains the distance between each detection point and the distance sensor 3. By doing in this way, the parking support device becomes able to use the detection point data and the sensor position data regardless of the travelling speed of the vehicle 1.

Next, the reflection point estimating unit 15 defines a circle centered at each sensor position and having a radius equal to the distance from the sensor position to the corresponding detection point on the basis of the detection point data and the sensor position data converted by the data complementing unit 14, as shown in FIG. 10(*b*). An arc on the side of the parked vehicle 2 of this circle corresponds to the detection area of the distance sensor 3.

After defining the arc passing through each detection point, the reflection point estimating unit 15 defines the points of intersection C1 to C5 of any two adjacent arcs respectively passing through adjacent detection points (Dn and Dn+1 or Dn+i; n is an integer equal to or larger than 1 and i is an integer equal to or larger than 2) as reflection points, and calculates the position coordinates of each of these reflection points. As a result, the reflection point estimating unit can estimate the approximate coordinates of each of the real reflection points.

The corner position determining unit 16 determines the position of a corner of the parked vehicle 2 from the position data about the reflection points estimated by the reflection point estimating unit 15. In FIG. 10, the reflection point C1 is determined to be the position of a corner.

Returning to the explanation of FIG. 4, the space length determining unit 17 determines the length of the parking space on the basis of the coordinates of the corner positions determined by the corner position determining unit 16 (step ST6). This determination result is outputted from the space length determining unit 17 to the output unit 10, and whether or not the vehicle can be parked in the parking space is displayed or outputted via voice to the driver of the vehicle 1 by way of at least one of the display monitor and the sound speaker which construct the output unit 10 (step ST7).

Hereafter, a concrete example of the determination of the parking space will be explained.

Figure 11:
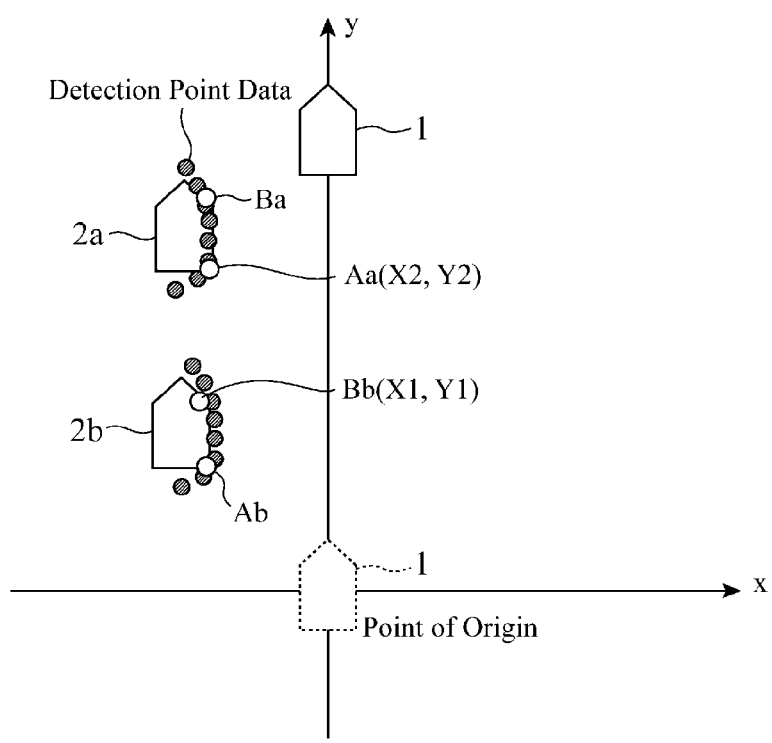
FIG. 11 is a view showing an example of a parking space determining process.

FIG. 11 is a view showing an example of the parking space determining process, and shows the case in which the drives parallel parks the vehicle 1 between the parked vehicles 2*a* and 2*b*. The data acquiring unit 11 acquires the detection point data and the sensor position data as data in the two-dimensional rectangular coordinate system which is parallel to the ground surface and in which the vehicle position is the origin point, the traveling direction of the vehicle 1 travelling by a parked vehicle 2 is defined as the y coordinate axis and the direction in which the distance to the parked vehicle is detected by one distance sensor 3 is defined as the x-coordinate axis on the basis of the position of the vehicle (vehicle 1) at the time when the system is started (at the time when an ON operation on the measurement start switch 8 is performed) and the distance information about the distance from the vehicle position to each detection point, as shown in FIG. 11.

The reflection point estimating unit 15 calculates the coordinates of the position of each corner of each of the parked vehicles 2*a* and 2*b* from the coordinates of the series of detection points in the coordinate system shown in FIG. 11. As a result, the parking support device determines the corner position of the rear Ab of the parked vehicle 2*b*, the corner position (X1, Y1) of the front Bb of the parked vehicle 2*b*, the corner position (X2, Y2) of the rear Aa of the parked vehicle 2*a*, and the corner position of the front Ba of the parked vehicle 2*a*.

By assuming that the parked vehicles 2*a* and 2*b* are parked along a road (along the direction of the y axis), the space length determining unit 17 calculates the length of the parking space between the parked vehicle 2*b* and the parked vehicle 2*b* from the difference (Y2−Y1) by using the corner position (X1, Y1) of the front Bb of the parked vehicle 2*b*, and the corner position (X2, Y2) of the rear Aa of the parked vehicle 2*a*.

Figure 12:
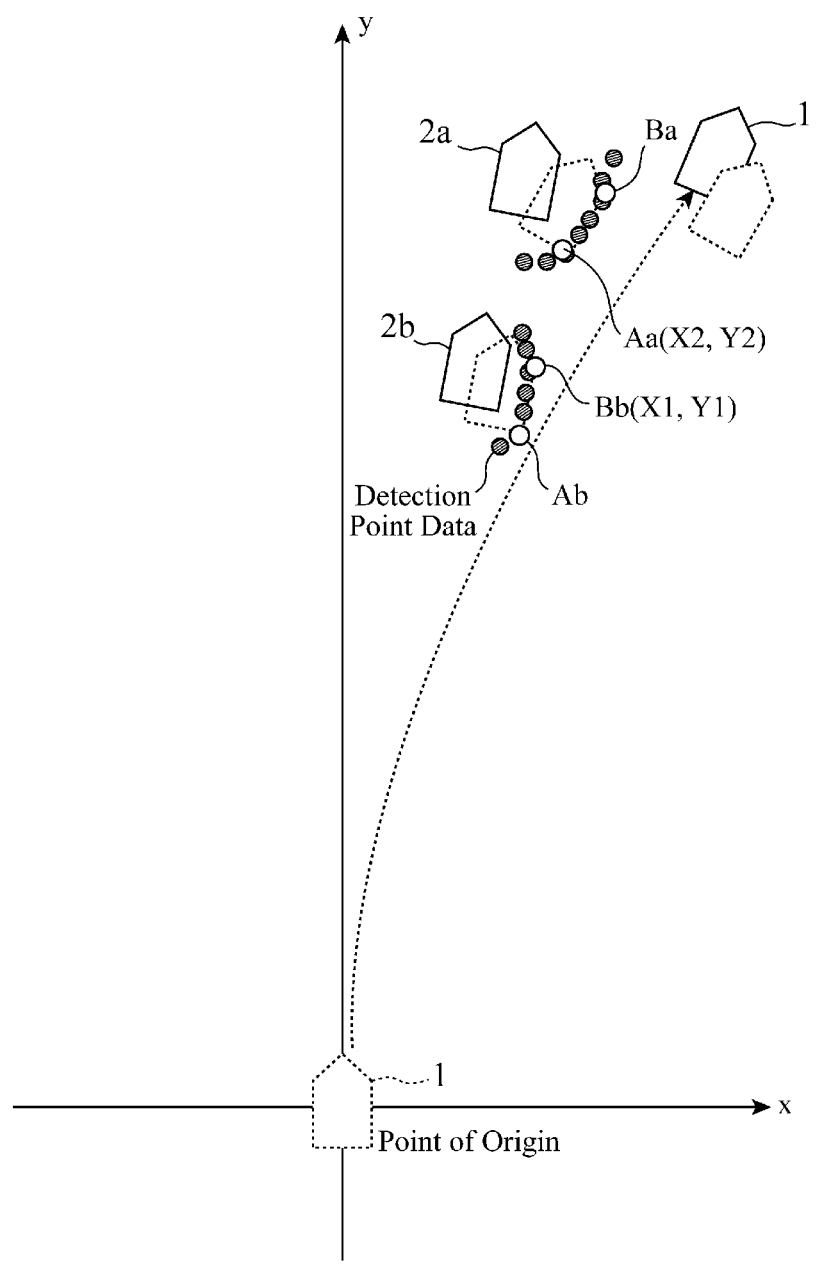
FIG. 12 is a view for explaining a displacement of a calculated vehicle position from a real vehicle position due to accumulated errors in the calculated vehicle position.

In a system which calculates the vehicle position from the wheel speed data, accumulated errors resulting from a wheel skid, the resolution of detection of the wheel speed, and so on occurs in the calculated vehicle position FIG. 12 is a view for explaining a displacement between the calculated vehicle position and the real vehicle position due to the occurrence of accumulated errors in the calculated vehicle position. In the example of FIG. 12, an ON operation is performed on the measurement start switch 8 and the system is started up at a position distant from the parked vehicles 2*a* and 2*b*, and a coordinate system having the vehicle position at this time as its point of origin is defined. In this case, because the vehicle 1 travels a long distance until one of the distance sensors 3 detects the distance to one of the parked vehicles, the parking support device is easily affected by the influence of accumulated errors occurring in the calculated vehicle position.

For example, although the real position of the vehicle 1 is shown by a solid line in FIG. 12, an erroneous position shown by a dashed line, which results from an accumulation of operation errors of the vehicle position and operation errors of the degree of steering angle, is determined. Furthermore, because the influence of an error occurring in the calculated vehicle position is also exerted upon the coordinates of the detection point positions on each of the parked vehicles 2*a* and 2*b*, and those of the corner positions, no real positions shown by solid lines are provided as the positions of the parked vehicles 2*a* and 2*b* and erroneous positions shown by dashed lines are determined.

Thus, accumulated errors occurring in the calculated vehicle position leads to reduction in the accuracy of the determination of a parking space. In order to reduce the influence of accumulated errors occurring in the calculated vehicle position, thereby improving the accuracy of the determination of a parking space, it is necessary to acquire detection points in a range of positions which are as close as possible to the point of origin of the coordinate system so that errors are not accumulated to have a significant influence upon the determination of a parking space. When there are two or more objects to be detected like the parked vehicles 2*a* and 2*b*, the coordinate system can be changed for each object to be detected.

Figure 13:
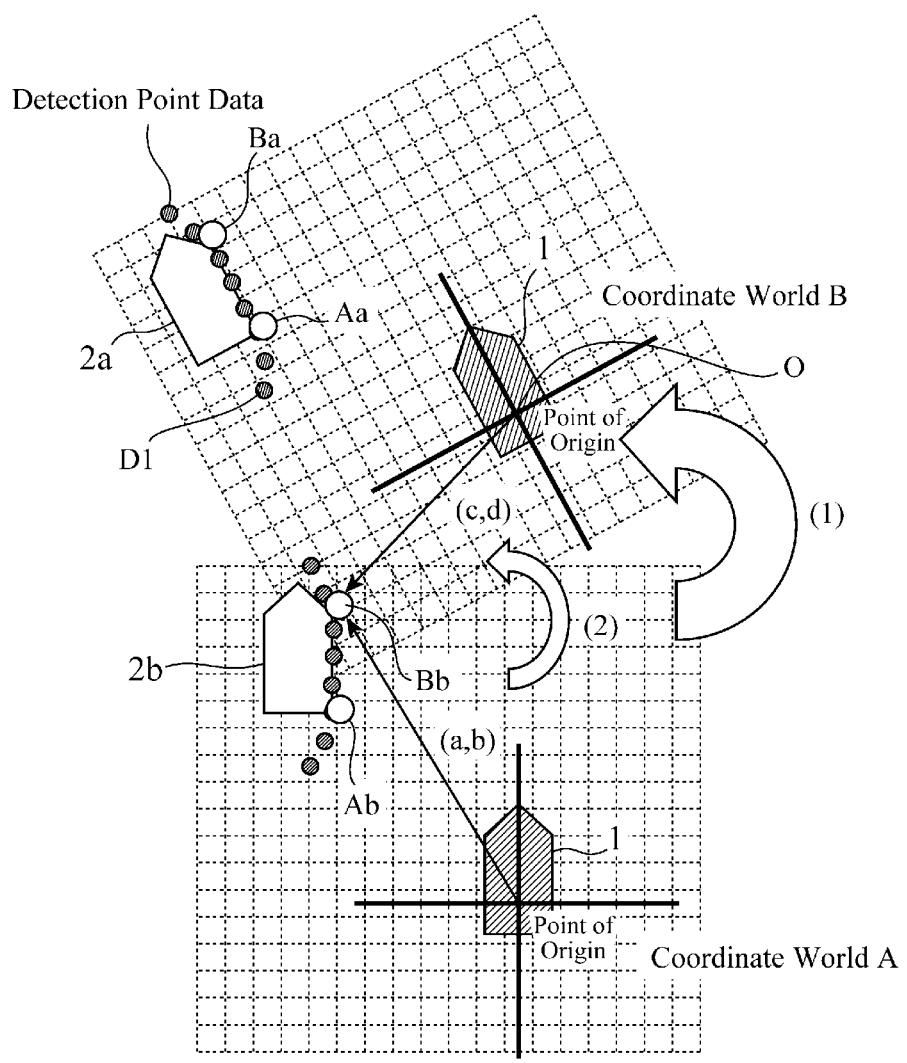
FIG. 13 is a view showing an example of a parking space determining process of changing a coordinate system for each detection object.

FIG. 13 is a view showing an example of the parking space determining process of changing the coordinate system for each object to be detected, and shows the case in which the driver parallel parks the vehicle 1 between the parked vehicles 2a and 2b. In the example of FIG. 13, the data acquiring unit 11 acquires the detection point data and the sensor position data as data in a two-dimensional rectangular coordinate system which is parallel to the ground surface and in which the vehicle position at the time when the system is started is the origin point, the traveling direction of the vehicle 1 travelling by the parked vehicle 2b (first object to be detected) closer to the vehicle 1 is defined as the y coordinate axis and the direction in which the distance to the parked vehicle is detected by one distance sensor 3 is defined as the x-coordinate axis. The data acquiring unit determines the position coordinates of each corner portion (rear Ab and front Bb) of the parked vehicle 2b by using these detection point data and sensor position data. This coordinate system will be referred to as a coordinate world A (first two-dimensional rectangular coordinate system).

Next, after the distance to the parked vehicle 2b is no longer detected as the vehicle 1 travels, that is, when the distance to the second parked vehicle 2a (second object to be detected) is detected and a detection point on the parked vehicle 2a starts being detected after the detection of a detection point on the first parked vehicle 2b has been stopped, the data acquiring unit 11 changes the coordinate world A to a new coordinate world B (refer to an arrow (1) of FIG. 13). This coordinate world B (second two-dimensional rectangular coordinate system) is a two-dimensional rectangular coordinate system which is parallel to the ground surface and in which a vehicle position θ at the time when the first detection point D1 on the parked vehicle 2a is detected or a predetermined number of detection points on the parked vehicle 2a are detected is defined as its point of origin, the traveling direction of the vehicle 1 travelling by the parked vehicle 2a is defined as the y coordinate axis and the direction in which the distance to the parked vehicle is detected by one distance sensor 3 is defined as the x-coordinate axis.

The position coordinates of each corner portion (rear Aa and front Ba) of the parked vehicle 2a are determined from the detection point data of the parked vehicle 2a and the sensor position data acquired in the coordinate world B. The data acquiring unit 11 also calculates the position coordinates of each corner portion (rear Ab and front Bb) of the parked vehicle 2b in the coordinate world B by mapping the coordinates in the coordinate world A to those in the coordinate world B. This mapped data is used for the parking space length determination in the coordinate world B.

For example, when the corner portion of the front Bb of the parked vehicle 2b has coordinates (a, b) in the coordinate world A, the data acquiring unit maps these coordinates (a, b) from the coordinate world A to the coordinate world B to calculate coordinates (c, d) (refer to an arrow (2) of FIG. 13). As a result, the space length determining unit 17 calculates the length of the parking space by using the coordinates of the corner position of the front Bb mapped to the coordinate world B and the coordinates of the corner position of the rear Aa acquired in the coordinate world B.

The group of detection points acquired in the coordinate world A can be deleted without being subjected to calculations for mapping to the coordinate world B after the corner position of the first parked vehicle 2b is calculated.

Furthermore, when the position coordinates of the plurality of corner portions of the parked vehicle 2b are acquired in the coordinate world A, only the corner position coordinates required for the parking space determination can be mapped to the coordinate world B to calculate the coordinates of the corner position in this coordinate world B, and the coordinates of the remaining corner position in the coordinate world A can be deleted. For example, because the coordinates of the corner position of the rear Ab of the parked vehicle 2b are not needed for the parking space determination, the coordinates of the corner position are deleted without being subjected to calculations for mapping to the coordinate world B.

As mentioned above, the parking support device according to this Embodiment 1 extracts detection point data corresponding to each corner portion of a parked vehicle 2 from detection point data showing a series of detection points at each of which the distance to the parked vehicle 2 is detected by a distance sensor 3 while the vehicle travels by the parked vehicle 2, performs a noise component removing process and a data complementing process using a curve approximation of the series of detection points on the extracted detection point data, estimates reflection points of a detection wave on the corner portion on the basis of the acquired detection point data and sensor position data showing the moving path of the distance sensor 3 moving as the vehicle 1 travels, and measures the length of a parking space adjacent to the parked vehicle 2 on the basis of the position of each corner which is determined from the positions of the estimated reflection points to determine if the vehicle 1 can be parked in the parking space.

Because the parking support device thus limits the application of a curve approximation to a corner portion mainly having a curved portion without determining any approximating curve from the detection point data about the whole of the parked vehicle 2 having a side which consists of a straight portion and curved portions, the parking support device can faithfully replicate the locus of detection points corresponding to each real corner portion of the parked vehicle. As a result, the parking support device can measure the parking space with a high degree of precision. In addition, the parking support device can determine the corner position (coordinates) and the parking space length with stability by complementing the detection point data from which noise components are removed by using a curve approximation of the series of detection points, and then estimating reflection points of the detection wave on each corner portion by using the complemented data.

Embodiment 2

The parking support device according to above-mentioned Embodiment 1 cannot determine the position of a corner of an object to be detected strictly when the corner portion of the object to be detected has a curved shape.

Figure 14:
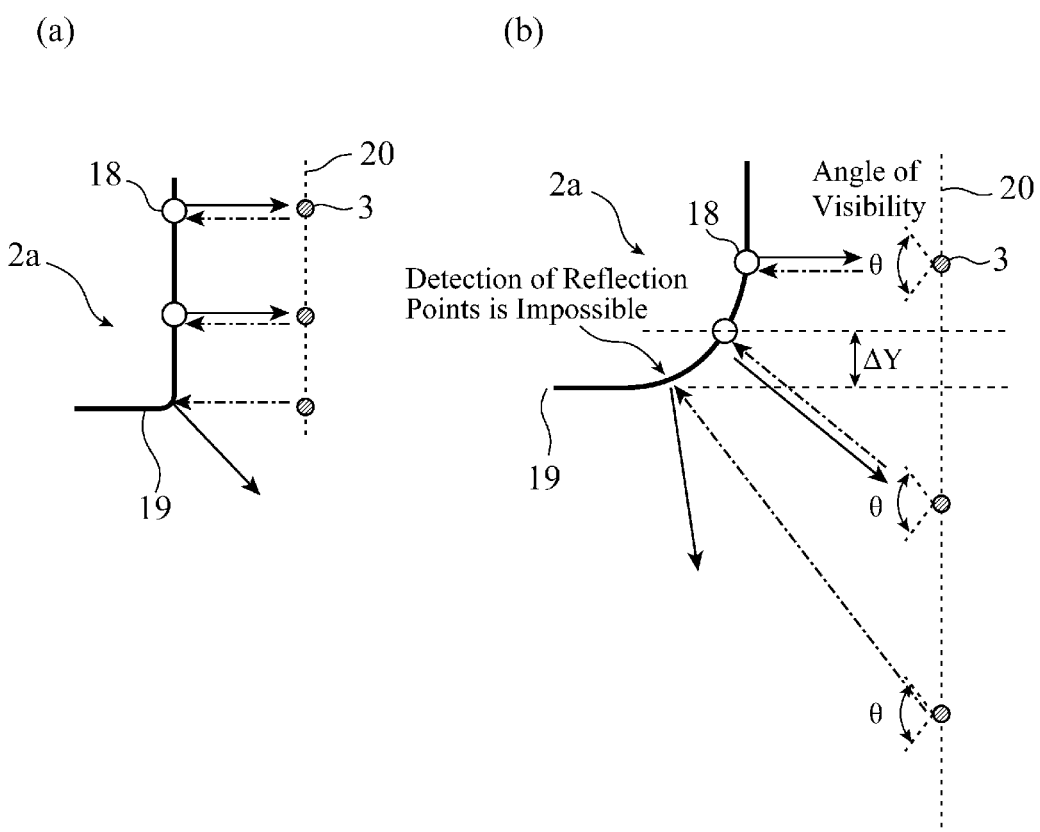
FIG. 14 is a view for explaining a factor that disables the parking support device to determine the position of a corner strictly.

FIG. 14 is a view for explaining a factor that disables the parking support device to determine the position of such a corner strictly. In FIG. 14, a distance sensor 3 applies a detection wave (shown by a dash-dotted arrow) of an ultrasonic wave to an object to be detected 2a, receives a reflected wave (shown by a solid arrow) from a reflection point 18 on the object to be detected 2a, and detects the distance to the object to be detected 2a while moving along the traveling path 20 of a vehicle 1.

When the object to be detected 2a has a corner portion having a curvature, there may be a case in which no reflected wave is received by the distance sensor 3 and the position of a corner end point 19 cannot be determined even though the corner curvature is small, as shown in FIG. 14(a) Furthermore, even if the distance sensor 3 can receive a reflected wave with an angle of visibility θ, there is a case in which when the object to be detected 2a has a corner having a large curvature, as shown in FIG. 14(b), the reflected wave from the corner portion deviates from the reception area with the angle of visibility θ dependently upon the position of the distance sensor 3, and the distance sensor fails in receiving the reflected wave.

Thus, when the distance sensor cannot carry out detection of a reflection point on the corner portion, the parking support device cannot grasp the whole shape of the corner portion, and cannot grasp the position of the corner end point 19 either. As a result, there is a possibility that the parking support device detects that an object to be detected, such as a vehicle, has a smaller size than the real one because the parking support device cannot determine the position of the endmost point of the object to be detected, the parking support device determines that a parking space has a larger size than the real one.

To solve this problem, a parking support device in accordance with Embodiment 2 corrects a corner position determined by a corner position determining unit 16 to a position which takes into consideration a corner end point 19 on the basis of a form of a series of estimated reflection points.

By doing in this way, the parking support device can implement more-practical parking space length determination. The form of a series of reflection points includes the separation distance between reflection points, variations in the separation distance, or an amount of depth from a straight line portion of the object to be detected.

Figure 15:
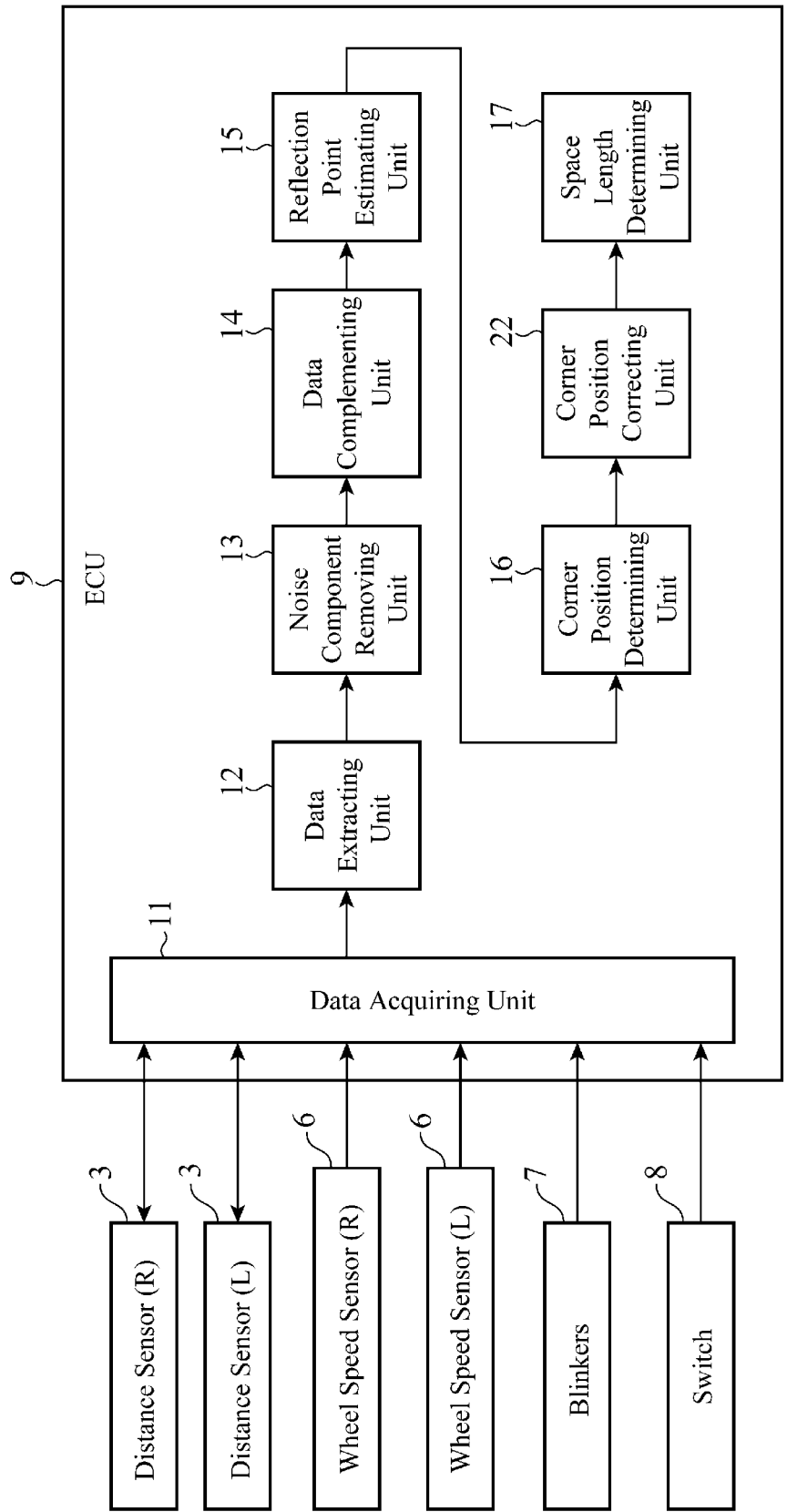
FIG. 15 is a block diagram showing the structure of the parking support device in accordance with Embodiment 1 of the present invention.

FIG. 15 is a block diagram showing the structure of the parking support device in accordance with Embodiment 2 of the present invention. The parking support device according to Embodiment 2 has a corner position correcting unit 22 as a functional component of an ECU 9 in addition to structural components as shown in FIG. 3, as shown in FIG. 15. The corner position correcting unit 22 is a component for correcting each corner position determined by the corner position determining unit 16 on the basis of the form of a series of reflection points estimated by the reflection point estimating unit 15. In the ECU 9 of FIG. 15, components which function in the same way that those shown in FIG. 3 function are designated by the same reference numerals, and the explanation of the components will be omitted hereafter.

Next, the operation of the parking support device will be explained.

Figure 16:
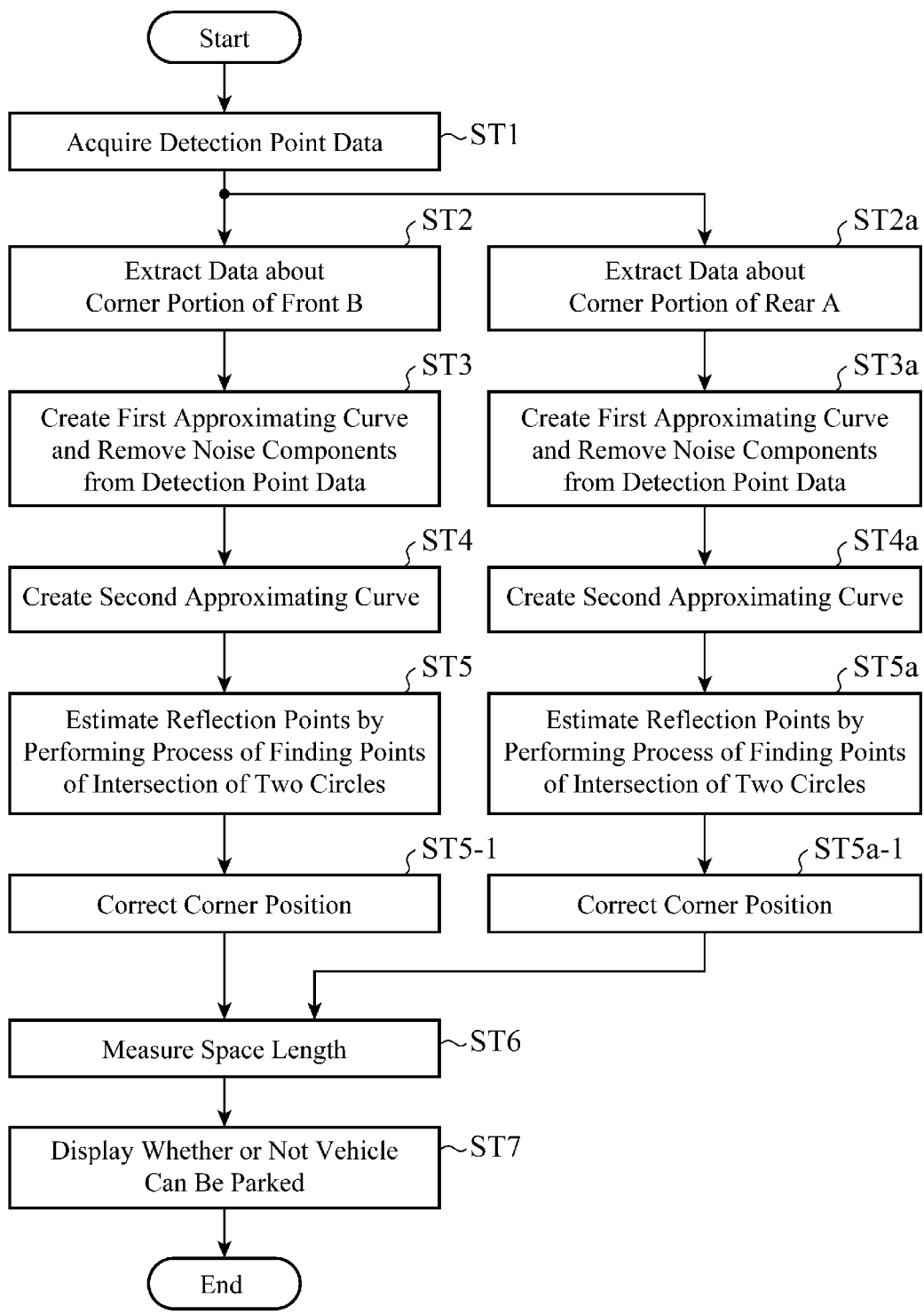
FIG. 16 is a flow chart showing a flow of a parking support operation performed by a parking support device in accordance with Embodiment 2.

FIG. 16 is a flow chart showing a flow of the parking support operation performed by the parking support device according to Embodiment 2. In FIG. 16, processes in steps ST1, ST2 to ST5, ST2a to ST5a, ST6, and ST7 are the same as those shown in above-mentioned Embodiment 1. Hereinafter, processes (corner position correcting processing) specific to Embodiment 2 will be explained.

The corner position correcting unit 22, in step ST5-1, receives the result of the determination of the corner position of a front B of a parked vehicle 2b, and reflection point data used for this determination from the corner position determining unit 16, defines the reflection point which is the endmost one of the group of reflection points shown by the reflection point data as a reference, and estimates a gap (correction amount) from this reflection point to the corner end point 19 by using the radius of curvature R of the corner portion of the front B to correct the coordinates of the corner position of the front B by using the estimated correction amount.

The corner position correcting unit 22 also receives the result of the determination of the corner position of a rear A of a parked vehicle 2a, and reflection point data used for this determination from the corner position determining unit 16, and estimates a correction amount from the radius of curvature R of the corner portion of the rear A on the basis of this reflection point data to correct the coordinates of the corner position of the rear A by using this correction amount (step ST5a-1).

In steps ST5-1 and ST5a-1, the correction of the corner position coordinates (Xcn, Ycn) is intended for correcting the coordinate in the Y axis direction. For example, when the radius of curvature determined on the basis of the reflection point data is expressed as R, the correction amount Ycnoffset for the Y axis coordinate is calculated according to the following equation (1a).

$$Ycn\text{offset} = \beta \times R + \alpha \quad (1a)$$

where α and β are coefficients of the correction amount.

The corner position correcting unit corrects the corner position coordinates (Xcn, Ycn) of each of the front corner and the rear corner by using the above-mentioned correction amount Ycnoffset. Because the Y-direction polarity of the correction for the front corner is reverse to that for the rear corner, the corrected Y coordinates Ycn'f and Ycn'r of the corner positions of the front and the rear are calculated according to the following equations.

$$Ycn'f = Ycn + Ycn\text{offset}$$

$$Ycn'r = Ycn - Ycn\text{offset}$$

The coefficients α and β of the correction amount can be set up separately for the front and the rear.

Hereafter, concrete examples (1) to (7) of a corner position correction algorithm will be explained.

(1) Correction Algorithm 1

In the correction algorithm 1, the curvature of a corner portion is estimated from the variance of the vector distance between any two adjacent reflection points, and a correction amount from the reflection point which is the endmost one of the reflection points to the corner end point is acquired by using this curvature.

Figure 17:
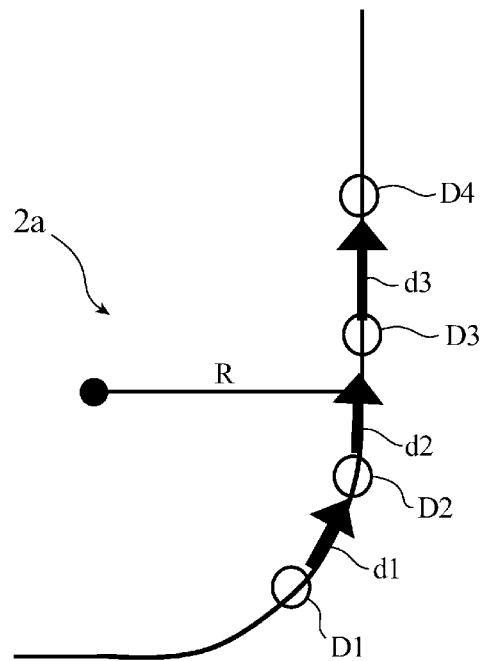
FIG. 17 is a view for explaining a correction algorithm 1 for correcting the position of a corner.

FIG. 17 is a view for explaining the correction algorithm 1 for correcting the position of a corner. For a portion parallel to the moving path of the distance sensor in the object to be detected 2a (e.g., a side of a parked vehicle), reflection points aligned at equal intervals according to the travelling speed of the vehicle equipped with the parking support device are acquired.

In contrast, because a corner portion having a curvature reflects the detection wave from the distance sensor located at plural sensor positions in a narrow region, the acquired reflection points are densely arranged on the corner portion.

Therefore, there is a tendency for the separation distance between any two adjacent reflection points in a corner portion (referred to as a vector distance from here on) to be shorter than the vector distance between any two adjacent reflection points in a portion parallel to the moving path of the distance sensor.

Therefore, according to the correction algorithm 1, the vector distance (d1, d2, d3, . . . , dn) between any two adjacent reflection points is determined with respect to the reflection point D1 which is the endmost one of the reflection points, the group of reflection points each having a vector distance di equal to or shorter than a predetermined threshold are defined as the reflection points of the corner portion. In this case, the variance of the vector distance of the above-mentioned extracted reflection point data is calculated by using the following equation (3). dave is the average of the vector distance in the above-mentioned group of reflection points of the corner portion.

$$\text{Variance } s^2 = \{\text{sum of } (di - d\text{ave})^2\}/n \quad (3)$$

Next, the radius of curvature R of the corner portion is estimated on the basis of the variance $s^2$ by using the following equation (3a).

$$R=(a1/s)+c1 \tag{3a}$$

where a1 and c1 are constants.

In addition, the position coordinates of the corner portion is corrected on the basis of the estimated radius of the curvature R by using the above-mentioned equation (1a).

(2) Correction Algorithm 2

In the correction algorithm 2, the curvature of the corner portion is estimated by using the average of the vector distance instead of the variance of the vector distance, and the position coordinates of the corner portion are corrected by using this curvature.

First, the vector distance (d1, d2, d3, ..., dn) between any two adjacent reflection points is determined with respect to the reflection point D1 which is the endmost one of the reflection points, the group of reflection points each having a vector distance di equal to or shorter than a predetermined threshold are defined as the reflection points of the corner portion, like in the case of the correction algorithm 1.

Next, the average dave of the vector distance in the above-mentioned group of reflection points of the corner portion is calculated, and the radius of curvature R of the corner portion is estimated on the basis of the average dave by using the following equation (3b)

$$R=a2 \times dave+c2 \tag{3b}$$

where a2 and c2 are constants.

In addition, the position coordinates of the corner portion is corrected on the basis of the estimated radius of the curvature R by using the above-mentioned equation (1a).

(3) Correction Algorithm 3

In the correction algorithm 3, the radius of curvature R is estimated by assuming that the corner portion is an arc.

Figure 18:
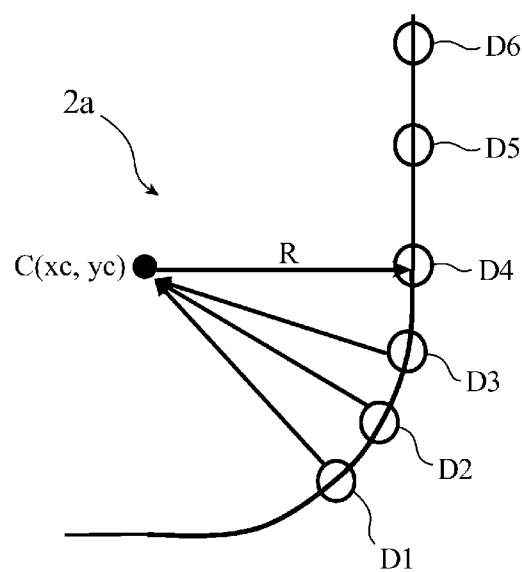
FIG. 18 is a view for explaining a correction algorithm 3 for correcting the position of a corner.

FIG. 18 is a view for explaining the correction algorithm for correcting the position of a corner. First, the reflection point D1 which is the endmost one of the reflection points is defined as a reference, and at least three reflection points (in the example of FIGS. 18, D1 to D3) including this reflection point D1 and reflection points which are close to the reflection point D1 are extracted.

By assuming that the reflection points D1 to D3 are located on the same arc approximating the corner shape, the radius of curvature R of the above-mentioned arc is calculated from the position coordinates of the reflection points D1 to D3.

After the three points on the same circle are determined, the center and the radius of the circle are determined. When the coordinates of the three points including the estimated reflection point which is the endmost one and the reflection points close to are expressed as D1 (x1, y1), D2 (x2, y2), and D3 (x3, y3), respectively, and the following equations: A=x1−x2, B=y1−y2, C=x1+x2, D=y1+y2, E=x3−x2, F=y3−y2, G=x3+x2, and H=y3+y2 are provided, the coordinates C(xc, yc) of the center are determined according to the following equation.

$$xc=\{B(HF+GE)-F(CA+BD)\}/\{2(BE-AF)\}$$

$$yc=\{E(CA+BD)-A(HF+GE)\}/\{2(BE-AF)\}$$

Next, the radius of curvature R is determined according to the following equation.

$$R=\sqrt{\{(xc-x1)^2+(yc-y1)^2\}}$$

In addition, the corner position coordinates are corrected by using the estimated radius of curvature R according to the above-mentioned equation (1a).

(4) Correction Algorithm 4

Figure 19:
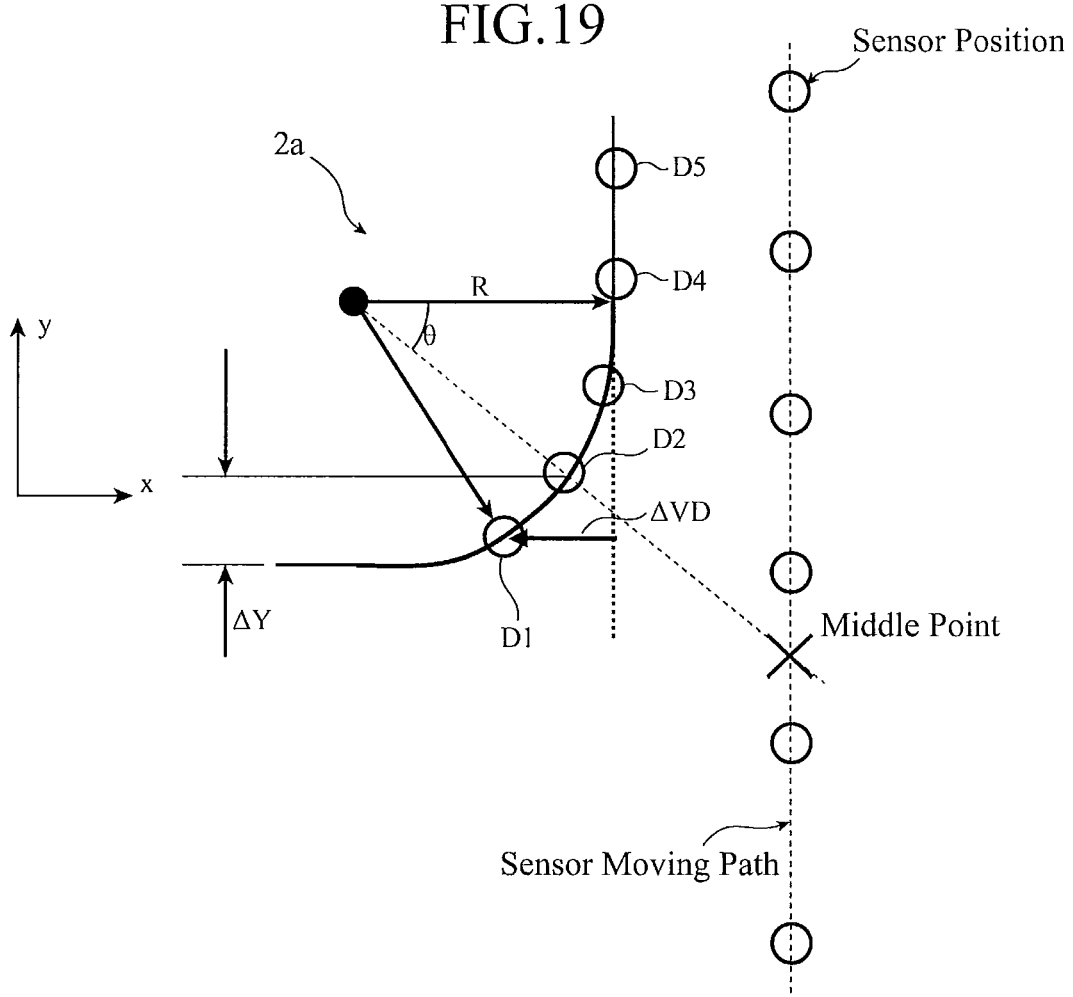
FIG. 19 is a view for explaining correction algorithms 4 and 5 each for correcting the position of a corner.

FIG. 19 is a view for explaining the correction algorithm 4, and a correction algorithm 5 for correcting the position of a corner, which will be mentioned below. In the correction algorithm 4, how far away from a portion parallel to the moving path of the sensor in the detection object 2a the reflection point D1 which is the endmost one of the reflection points is located inward is calculated, and a correction amount is calculated on the basis of this distance.

As shown in FIG. 19, an xy coordinate system in which a direction in which the sensor moves is defined as the y axis is set up, the difference $\Delta VD$ between the x coordinate of the position of the reflection point D1 which is the endmost one of the reflection points of the detection object 2a and the x coordinate of the portion (the reflection points D4 and D5) parallel to the moving path of the sensor in the detection object 2a (how far away the reflection point D1 is located inward from the portion) is calculated, and the corner position correction amount Ycnoffset is determined on the basis of this difference value $\Delta VD$ by using the following equation (1a-4) to correct the corner position coordinates.

$$Ycn\text{offset}=\beta \times \Delta VD+\alpha \tag{1a-4}$$

where $\alpha$ and $\beta$ are coefficients of the correction amount.

(5) Correction Algorithm 5

In the correction algorithm 5, how far away from a portion parallel to the moving path of the sensor in the detection object 2a the reflection point D1 which is the endmost one of the reflection points is located inward is calculated, and a correction amount is calculated on the basis of this distance, like in the case of the correction algorithm 4.

As shown in FIG. 19, an xy coordinate system in which a direction in which the sensor moves is defined as the y axis is set up, the difference $\Delta VD$ between the x coordinate of the position of the reflection point D1 which is the endmost one of the reflection points and the x coordinate of the portion parallel to the moving path of the sensor in the detection object 2a (how far away the reflection point D1 is located inward from the portion) is calculated, and the correction amount $\Delta Y$ is calculated by using the following equations (4) to (7). In this case, the angle $\theta$ of the reflection point D1 with respect to the center of the arc having the radius of curvature R is calculated from the slope of a line connecting between the middle point between the coordinates of the sensor positions which are the centers of the two circles used when estimating the reflection point D1, and the reflection point.

$$\Delta VD=R-R \times \cos \theta \tag{4}$$

$$\Delta Y=R-R \times \sin \theta \tag{5}$$

$$R=\Delta VD/(1-\cos \theta) \tag{6}$$

$$\Theta=\arctan(a) \tag{7}$$

The following equation (8) is acquired from the above-mentioned equations (4), (5), and (6).

$$\Delta Y=(1-\sin \theta)/(1-\cos \theta) - \Delta VD \tag{8}$$

The corner position correction amount Ycnoffset is determined on the basis of this value $\Delta Y$ according to the following equation (1a-5) to correct the corner position coordinates.

$$Ycn\text{offset}=\beta \times \Delta Y+\alpha \tag{1a-5}$$

where $\alpha$ and $\beta$ are coefficients of the correction amount.

(6) Correction Algorithm 6

In the correction algorithm 6, the series of reflection points estimated by the reflection point estimating unit 15 are assumed to be on the same circle, and the radius of curvature R is estimated on the basis of the difference in the angle θ with respect to the center of the arc having the radius of curvature R between two adjacent reflection points, i.e., Δθ.

Figure 20:
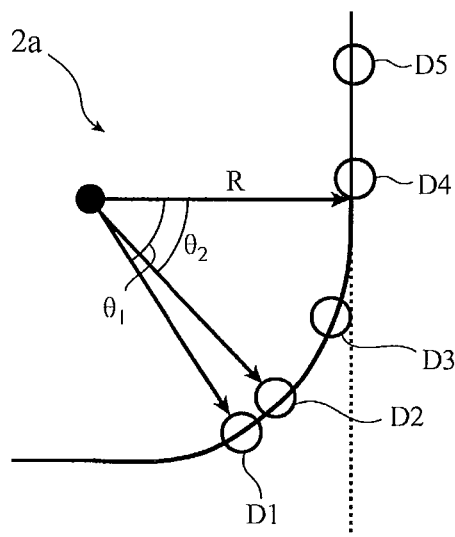
FIG. 20 is a view for explaining a correction algorithm 6 for correcting the position of a corner.

FIG. 20 is a view for explaining the correction algorithm 6 for correcting the position of a corner. In FIG. 20, each of the angles θ1 and θ2 of the reflection points with respect to the center of the arc having the radius of curvature R is calculated from the slope of a line connecting between the middle point between the coordinates of the sensor positions which are the centers of the two circles used when estimating each of the reflection points, and the reflection point, like in the case of the above-mentioned correction algorithm 4.

Because the amount of change Δθ1 (=θ1-θ2) of the angle θ with respect to the reflection point D1 which is the endmost one of the reflection points decreases with decrease in the radius of curvature R when the angle θ has a large value, the tendency of Δθi is determined for a plurality of reflection points close to the reflection point D1 which is the endmost one of the reflection points, and the radius of curvature R is calculated from a correspondence between the tendency of Δθi which is calculated beforehand and the radius of curvature R by using the following equation (1a-6). Furthermore, a function F(θ) showing the above-mentioned tendency is determined by using the following equation (9).

$$F(\theta) = \{1/(n-1)\}\Sigma(\Delta\theta i) \quad (9)$$

$$R = F(\theta) \times \alpha + \beta \quad (1a\text{-}6)$$

where α and β are coefficients of the correction amount, and i=1 to n.

In addition, the corner position coordinates are corrected by using the estimated radius of curvature R according to the above-mentioned equation (1a).

In this case, in order to limit the range of reflection points for each which Δθ is calculated to reflection points close to the reflection point D1 which is the endmost one of the reflection point data, the value of n is set to, for example, 3.

Furthermore, by assuming that the portion parallel to the moving path of the sensor in the detection object 2a is a straight line (shown by a dashed line in FIG. 20) and the corner portion is an arc tangent to the above-mentioned straight line, Δθ increases with decrease in the radius of curvature R in a boundary portion between the straight line and the arc (a portion in the vicinity of the reflection point D4 in FIG. 20) if the straight line is an ideal one and the arc is tangent to this ideal straight line. Therefore, the radius of curvature R can be calculated on the basis of the maximum of the amount of change Δθ of the angle θ with respect to a reflection point which is found for the first time after the series of line segments connecting between the series of reflection points change in shape from a straight line to an arc. In this case, the range in which Δθ is calculated in the above-mentioned equation (9) is set to, for example, i=2 to 4 and n=3.

(7) Correction Algorithm 7

In the correction algorithm 7, a small-sized obstacle and a large-sized obstacle are distinguished from each other according to the lengths of their series of reflection points in a direction along the moving path of a sensor, and different corner position correction amounts are applied to the small-sized obstacle and the large-sized obstacle which are distinguished from each other, respectively.

Figure 21:
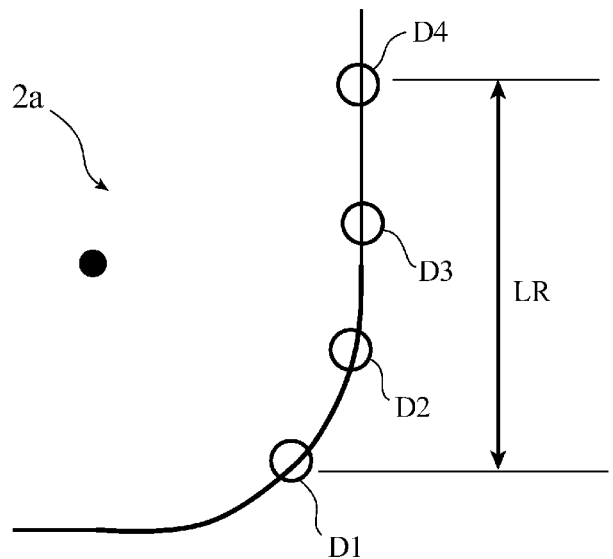
FIG. 21 is a view for explaining a correction algorithm 7 for correcting the position of a corner.

FIG. 21 is a view for explaining the correction algorithm 7 for correcting a corner position. For example, when detecting a detection object 2a having a corner portion whose radius of curvature R is small (refer to FIG. 13 (a)), because the length of its series of detection points in a direction along the moving path of a sensor (an y axis direction in FIG. 21) corresponds to the length of the side of the above-mentioned detection object 2a extending in the direction along the sensor moving path, the approximate size of the detection object 2a can be determined from the length of the series of detection points in the y axis direction.

However, when detecting a small-sized detection object 2a having a cylindrical shape as shown by FIG. 9(a), because detection points are widely distributed along the traveling direction of the vehicle with respect to the size of the detection object 2a, the size of the detection object 2a cannot be determined from the series of detection points.

In contrast, as explained with reference to FIG. 9(a), because the reflection points are densely arranged in a narrow region of the small-sized detection object 2a, the length LR in the y axis direction of the series of reflection points, becomes close to the size in the y axis direction of the detection object 2a. More specifically, a small-sized detection object 2a and a large-sized detection object 2a can be distinguished from each other according to the lengths LR in the y axis direction of their series of reflection points.

Therefore, the correction algorithm 7, whether a detection object is a small-sized one or a large-sized one is determined according to the length LR in the y axis direction of its series of reflection points, and a corner position correction amount different according to whether the detection object is a small-sized one 2a or a large-sized one 2b is applied.

For example, when detecting a small-sized detection objects 2a such as a cone or a pole, because the reflection points are densely arranged in a certain region of the small-sized detection object 2a, the length LR in the y axis direction of the series of reflection points become nearly equal to the size in the y axis direction of the detection object 2a. Therefore, a correction amount from the position of the reflection point D1 is estimated to be small, and is set to a value equal to or smaller than a predetermined threshold value C1 associated with the correction amount.

In contrast, when detecting a large-sized detection object 2a such as a parked vehicle, because its series of reflection points are extending along a certain direction of a side of the large-sized detection object 2a, the size in the y axis direction of the large-sized detection object 2a is determined to be the length LR in the y axis direction of the series of reflection points, and a value exceeding the predetermined threshold value C1 is set as a correction amount.

(8) Correction Algorithm 8

In the correction algorithm 8, the radius of curvature of a corner portion is estimated on the basis of the variance of the separation distance of each reflection point from the center of gravity of a series of reflection points in the corner portion, and a correction amount from the reflection point which is the endmost one of them to a corner end point is acquired by using this radius of curvature.

Figure 22:
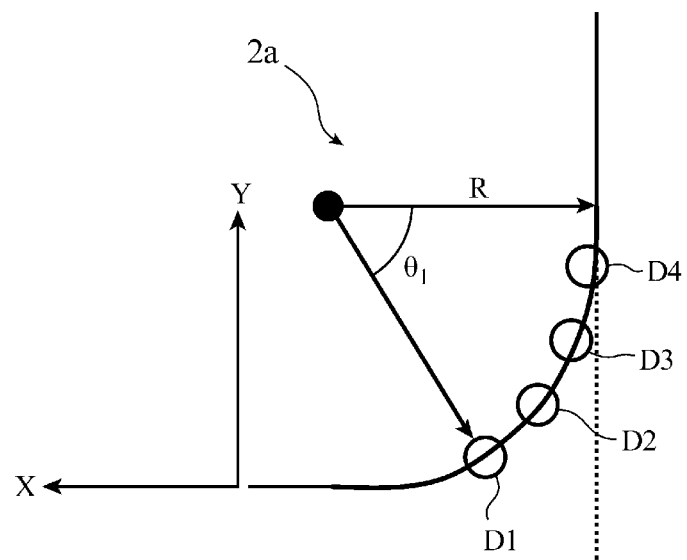
FIG. 22 is a view for explaining a correction algorithm 7 for correcting the position of a corner.

FIG. 22 is a view for explaining the correction algorithm 8 for correcting the position of a corner. In the correction algorithm 8, the average of the x coordinates of the reflection points D1 to D4 in the corner portion and the average of the y coordinates of the reflection points are calculated, the coordinate position having these averages is defined as the center of gravity, and the variance of the separation distance of each reflection point from the center of gravity is determined by using the following equation (10).

The coordinates of each reflection point is expressed as (xi, yi), the average of the coordinates of all the reflection points in the corner portion is expressed as the coordinates of the center of gravity ($x_{ave}$, $y_{ave}$) and the following equations:

$dxi=xi-x_{ave}$ and $dyi=yi-y_{ave}$ are provided, where i is an integer ranging from 1 to the total number N of reflection points in the corner portion.

$$\text{Variance } \sigma 7 = \sqrt{\{\text{sum of } (dxi^2+dyi^2)\}/N} \tag{10}$$

When the reflection points are densely arranged (the variance σ7 is close to zero), the radius of curvature R of the corner portion is small. In contrast, when the variance σ7 is large, the radius of curvature R of the corner portion is large. By using this tendency, the radius of curvature R of the corner portion is estimated according to the following equation (1a-7).

$$R = a7 \times \sigma 7 + c7 \tag{1a-7}$$

where a7 and c7 are constants.

The corner position is corrected by using the estimated radius of curvature R according to the above-mentioned equation (1a).

As mentioned above, because the parking support device according to this Embodiment 2 has the corner position correcting unit 22 for correcting each corner position determined by the corner position determining unit 16 on the basis of the form of a series of reflection points estimated by the reflection point estimating unit 15, the parking support device can carry out more practical determination of the length of a parking space.

Industrial Applicability

Because the parking support device in accordance with the present invention can measure the length of a parking space adjacent to a detection object with a high degree of precision, the parking support device is suitable for use as a parking support device which measures a parking space for parallel parking, and notifies a driver if the driver can park his or her vehicle in the parking space.

The invention claimed is:

1. A parking support device comprising:
a distance sensor unit for applying a detection wave, and receiving a reflected wave of said detection wave from an object to be detected to detect a distance to said object to be detected;
a wheel speed sensor unit for detecting a wheel speed of a vehicle;
a data acquiring unit for receiving an output of said distance sensor unit and an output of said wheel speed sensor unit when said vehicle is travelling by said object to be detected to create sensor position data showing a moving path of said distance sensor unit which moves as said vehicle travels on a basis of a traveled distance of said vehicle which is determined from the wheel speed detected by said wheel speed sensor unit, while acquiring detection point data showing a series of detection points for each of which a distance is detected by said distance sensor unit moving along said moving path;
a data extracting unit for extracting detection point data corresponding to a corner portion of said object to be detected from the detection point data acquired by said data acquiring unit;
a noise component removing unit for approximating a series of detection points of the detection point data extracted by said data extracting unit with a curve to determine a detection point which is a noise component on a basis of the approximating curve, and for removing this detection point from said detection point data;
a data complementing unit for approximating the series of detection points of the detection point data from which the noise component is removed by said noise component removing unit to perform a data complementing process on said detection point data;
a reflection point estimating unit for estimating reflection points of said detection wave in the corner portion of said object to be detected on a basis of the detection point data on which the data complementing process is performed by said data complementing unit, and the sensor position data acquired by said data acquiring unit;
a corner position determining unit for determining a position of the corner portion of said object to be detected on a basis of positions of the reflection points estimated by said reflection point estimating unit; and
a space length determining unit for measuring a length of a parking space adjacent to said object to be detected on the basis of the position of the corner portion determined by said corner position determining unit, and for presenting a result of determination of whether or not the vehicle can be parked in the parking space to a driver.

2. The parking support device according to claim 1, wherein the data acquiring unit is triggered to start storing the output of the distance sensor unit and the output of the wheel speed sensor unit by an operation of starting measurements, and, when any distance is not detected by said distance sensor unit while the vehicle travels a predetermined distance or longer, temporarily stops the storage of the wheel speed detected by said wheel speed sensor unit while restarting the storage of the wheel speed detected by said wheel speed sensor unit when a distance is newly detected by said distance sensor unit.

3. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the data extracting unit defines rectangles each having a detection point in the series of detection points of the detection point data, as its vertex connected to other detection points adjacent to the detection point thereof via sloping lines, and compares an area ratio of divided regions of said rectangles, which are acquired by dividing said rectangles by using said sloping lines, with a predetermined threshold to determine detection point data corresponding to the corner portion of said object to be detected from a result of said comparison.

4. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the data extracting unit searches for a point of intersection of a series of points of detection point data on which a low pass filter process is performed to approximate the corner portion of said object to be detected with a curve, and the series of detection points of said detection point data, and determines detection point data corresponding to said corner portion on a basis of a detection point which is said point of intersection.

5. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the data extracting unit compares a difference between coordinates of detection point data on which a low pass filter process is performed to approximate the corner portion of said object to be detected with a curve and those of a detection point of said detection point data with a predetermined threshold, and determines detection point data corresponding to said corner portion from a result of said comparison.

6. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the noise component removing unit defines, as a threshold, a value which the noise component removing unit acquires by multiplying a standard deviation of a difference between the curve approximating the series of detection points of the detection point data and coordinates in said distance detection direction of the series of detection points of said detection point data by a fixed coefficient, and determines a detection point whose value associated with said standard deviation exceeds said threshold as a noise component, and removes this noise component.

7. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the noise component removing unit defines, as a threshold, a value which the noise component removing unit acquires by multiplying a standard deviation of a difference between the curve approximating the series of detection points of the detection point data and coordinates in said distance detection direction of the series of detection points of said detection point data by a first coefficient and then adding a second coefficient to a result of the multiplication and then defines said first and second coefficients as characteristic values in portions located inside and outside said approximating curve, respectively, and determines a detection point whose value associated with said standard deviation exceeds said threshold as a noise component, and removes this noise component.

8. The parking support device according to claim 1, wherein the data complementing unit converts the detection point data and the sensor position data on a basis of an endmost detection point of the series of detection points in such a way that the detection points and the sensor position are aligned at fixed intervals along the traveling direction of the vehicle.

9. The parking support device according to claim 1, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the reflection point estimating unit assumes a circle centered at each sensor position and having a radius equal to a distance from the sensor position to a detection point on a basis of the detection point data and the sensor position data, and estimates a point of intersection of two circles passing through adjacent detection points as a reflection point.

10. The parking support device according to claim 1, wherein when measuring a length of a parking space between a first object to be detected closer to the vehicle and a second object to be detected farther from the vehicle, the data acquiring unit acquires detection point data and sensor position data as data in a first two-dimensional rectangular coordinate system which is parallel to a ground surface and in which a position of the vehicle at a time of an operation of starting measurements is defined as a point of origin, a traveling direction of the vehicle travelling by said first object to be detected is defined as a coordinate axis and a direction in which the distance is detected by the distance sensor unit is defined as another coordinate axis perpendicular to said coordinate axis, and, when the distance to said first object to be detected is no longer detected by said distance sensor unit and the distance to said second object to be detected is detected by said distance sensor unit as the vehicle travels, acquires detection point data and sensor position data as data in a second two-dimensional rectangular coordinate system which is parallel to a ground surface, and in which a position of the vehicle at that time is defined as a point of origin, and a traveling direction of the vehicle travelling by said second object to be detected is defined as a coordinate axis and a direction in which the distance is detected by the distance sensor unit is defined as another coordinate axis perpendicular to said coordinate axis, and converts the detection point data and the sensor position data which the data acquiring unit acquires in said first two-dimensional rectangular coordinate system into data mapped from said first two-dimensional rectangular coordinate system to said second two-dimensional rectangular coordinate system.

11. The parking support device according to claim 1, wherein said parking support device includes a corner position correcting unit for correcting the position of the corner portion which is determined by the corner position determining unit on a basis of a form of the series of reflection points estimated by the reflection point estimating unit on a basis of a form of the reflection points in the corner portion.

12. The parking support device according to claim 11, wherein the corner position correcting unit corrects the position of the corner portion according to a length of a series of reflection points acquired along the traveling direction of the vehicle with reference to an endmost reflection point in the corner portion.

13. The parking support device according to claim 11, wherein the corner position correcting unit estimates a radius of curvature of the corner portion from a variance of a separation distance between any two adjacent ones of the reflection points in the corner portion, and calculates a corner position correction value according to the estimated radius of curvature and with reference to an endmost reflection point in the corner portion.

14. The parking support device according to claim 11, wherein the corner position correcting unit estimates a radius of curvature of the corner portion from an average of a separation distance between any two adjacent ones of the reflection points in the corner portion, and calculates a corner position correction value according to the estimated radius of curvature and with reference to an endmost reflection point in the corner portion.

15. The parking support device according to claim 11, wherein the corner position correcting unit calculates a radius of a circle passing through at least three reflection points including an endmost reflection point in the corner portion and reflection points located in a vicinity of this endmost reflection point as a radius of curvature of said corner portion, and calculates a corner position correction value according to the calculated radius of curvature and with reference to the endmost reflection point in said corner portion.

16. The parking support device according to claim 11, wherein in a two-dimensional rectangular coordinate system which is parallel to a ground surface and in which a traveling direction of the vehicle travelling by the object to be detected is defined as a coordinate axis and a direction in which the distance is detected by the distance sensor unit is defined as another coordinate axis perpendicular to said coordinate axis, the corner position correcting unit calculates a difference between a coordinate in said distance detection direction of a position of an endmost reflection point in the corner portion and that in said distance detection direction of a portion of said object to be detected parallel to the traveling direction of said vehicle, and calculates a corner position correction value according to the calculated difference and with reference to the endmost reflection point in said corner portion.

17. The parking support device according to claim 11, wherein the corner position correcting unit assumes a series of reflection points in the corner portion as points on a same circle, calculates a radius of curvature of said circle by using an amount of change between reflection points having adjacent angles which the reflection points form with a center of said circle, respectively, and calculates a corner position correction value according to the calculated radius of curvature and with reference to an endmost reflection point in said corner portion.

18. The parking support device according to claim 11, wherein the corner position correcting unit estimates a radius of curvature of said corner portion on a basis of a variance of a separation distance between each reflection point and a center of gravity of the series of reflection points in the corner portion, and calculates a corner position correction value according to the estimated radius of curvature and with reference to an endmost reflection point in said corner portion.

* * * * *